(12) United States Patent
Hull et al.

(10) Patent No.: US 6,487,457 B1
(45) Date of Patent: Nov. 26, 2002

(54) DATABASE FOR A REMOTELY ACCESSIBLE BUILDING INFORMATION SYSTEM

(75) Inventors: Julie Jean Hull, Columbia Heights; Patrick James O'Neill, Elk River; John Warren Meisner, Minnetonka, all of MN (US)

(73) Assignee: Honeywell International, Inc., Minneapolis, MN (US)

( * ) Notice: Subject to any disclaimer, the term of this patent is extended or adjusted under 35 U.S.C. 154(b) by 0 days.

(21) Appl. No.: 09/502,944

(22) Filed: Feb. 11, 2000

Related U.S. Application Data

(63) Continuation-in-part of application No. 09/322,495, filed on May 28, 1999.
(60) Provisional application No. 60/119,928, filed on Feb. 12, 1999.

(51) Int. Cl.[7] .............................................. G05B 11/01
(52) U.S. Cl. ............................ 700/17; 700/83; 700/86; 700/17; 700/28; 700/275; 345/734; 345/804; 707/104.1
(58) Field of Search .................... 707/1–10, 100–104.1; 709/100–108, 200–203, 217–229, 1; 345/964–970, 764–765, 771–774, 734, 804; 700/1–6, 83, 182, 275, 86, 286, 291, 276, 17

(56) References Cited

U.S. PATENT DOCUMENTS

| | | | |
|---|---|---|---|
| 4,918,615 A | * 4/1990 | Suzuki et al. | 307/38 |
| 5,289,362 A | 2/1994 | Liebl et al. | 364/140 |
| 5,499,371 A | 3/1996 | Henninger et al. | 395/700 |
| 5,586,254 A | * 12/1996 | Kondo et al. | 370/254 |
| 5,611,059 A | * 3/1997 | Benton et al. | 345/734 |
| 5,671,361 A | 9/1997 | Brown et al. | 395/209 |
| 5,706,455 A | * 1/1998 | Benton et al. | 345/804 |
| 5,761,674 A | 6/1998 | Ito | 707/104 |
| 5,893,074 A | 4/1999 | Hughes et al. | 705/8 |
| 5,948,063 A | * 9/1999 | Cooper et al. | 370/373 |
| 5,950,206 A | 9/1999 | Krause | 707/104 |
| 5,991,769 A | 11/1999 | Fino et al. | 707/104 |
| 6,067,477 A | * 5/2000 | Wewalaarachchi et al. | 700/17 |
| 6,088,659 A | * 7/2000 | Kelley et al. | 340/870.02 |
| 6,104,963 A | * 8/2000 | Cebasek et al. | 700/17 |
| 6,141,595 A | * 10/2000 | Gloudeman et al. | 700/83 |
| 6,157,943 A | * 12/2000 | Meyer | 709/203 |
| 6,178,362 B1 | * 1/2001 | Woolard et al. | 700/28 |
| 6,240,326 B1 | * 5/2001 | Gloudeman et al. | 700/275 |

FOREIGN PATENT DOCUMENTS

| | | |
|---|---|---|
| DE | 195 17 162 A 1 | 10/1995 |

OTHER PUBLICATIONS

PCT International Search Report for PCT/US 00/03529.

* cited by examiner

Primary Examiner—John Breene
Assistant Examiner—Linh Black
(74) Attorney, Agent, or Firm—Merchant & Gould P.C.

(57) ABSTRACT

A building information system stores and processes both building management system (BMS) data and building-related configuration information, such as building and equipment descriptions and locations, point and meter descriptions, contact information for alarms, utility rates, and manufacturer and vendor information. The BMS data is stored in multiple configurations, including analog, binary, multistate, input and output. One or more mapping structures establish database relationships between the dynamic BMS data received from or destined to points, meters, and controllers on a BMS network. By combining these two types of data in a central repository, building information system services, tools and applications can be integrated through published interfaces to provide expandable functionality. Based on the mapping structures, the building information system services, tools, and applications access BMS data and corresponding configuration data to derive additional data (e.g., power consumption based on monitored current consumption), provide enhanced communications with a client (e.g., email-based alarm notification), and identify point discovery mismatches.

26 Claims, 29 Drawing Sheets

DATABASE FOR A REMOTELY ACCESSIBLE BUILDING INFORMATION SYSTEM

The present application is a continuation-in-part of U.S. patent application Ser. No. 09/322,495 entitled A REMOTELY ACCESSIBLE BUILDING INFORMATION SYSTEM, filed May 28, 1999, and claims benefit of U.S. Provisional Application No. 60/119,928 entitled A REMOTELY ACCESSIBLE BUILDING INFORMATION SYSTEM, filed Feb. 12, 1999, which is specifically incorporated herein for all that it discloses and teaches.

BACKGROUND OF THE INVENTION

1. Field of the Invention

The present invention relates generally to electrical communications systems, and more particularly to systems and data structures for storing data used in monitoring and controlling equipment in a building coupled to a building information system (BIS).

2. Description of Related Art

In a large modern building, such as a manufacturing plant, a building operator can use a dedicated Building Management System (BMS) to manage different building subsystems coupled to the building, including boilers, thermostats, electrical subsystems, controllers, meters, and other equipment. The dedicated BMS typically monitors and controls the building subsystems using a communications network coupling each of the building subsystems. For example, the building operator can use a dedicated BMS to monitor the temperature in a specific zone of the building and to increase or decrease the heat provided to that zone. Typically, a dedicated BMS is executed in a personal computer or workstation located in the building, although such systems can also be operated remotely via a dial-up connection, a local-area network (LAN) or wide-area network (WAN). The data recorded by a dedicated BMS, however, is not readily available to other BMSs or to other applications that would benefit from such data. Furthermore, older dedicated BMSs have typically managed building components using a proprietary channel, which presents an obstacle to adding new service components, interfaces, or clients from different vendors.

Modern BMSs, however, have moved away from the proprietary systems of the late 1980s with the intent of improving a building operator's ability to integrate different vendors' subsystems. Such systems, facilitated by industry standard communication protocols such as "BACnet" and "Echelon", are typically characterized as "open-systems" and provide non-proprietary communication interfaces among building subsystems marketed by different vendors. Generally, BACnet and Echelon refer to different types of open-system building network protocols, which allow other BACnet-compliant or Echelon-compliant BMSs and building subsystems to communicate together. In contrast to dedicated BMSs that communicate over proprietary channels, open-system BMSs can provide ready, automatic access to disparate building subsystems without the need for specially developed, vendor-specific interfaces to each vendor's building subsystem. In other words, an open-system BMS can seamlessly communicate among the building subsystems of different vendors by providing an open-system interface supporting an open-system building network, like BACnet or Echelon.

While open-system BMSs address customer demands for choice and interoperability for managing building subsystems, modern BMSs do not fully address the complex requirements of modern building operators. The EXCEL BUILDING SUPERVISOR (XBS) v. 1.4.2, marketed by Honeywell, Inc., is an example of a BMS, which is typically used to locally manage and control a building, including accessing dynamic data detected from points and meters within the building, viewing historical dynamic data, setting schedules for turning specific points on or off, viewing alarms when the dynamic data fails to satisfy an acceptable condition, and issuing control commands to points in the building. The term "points" refers to sensors and actuators on various building subsystems.

The BMS data provided by a typical building information system, however, is severely limited in quantity and scope, consisting essentially of dynamic BMS data and BMS attributes. The dynamic (or time-varying) data is detected from or provided to points, meters, and controllers within one or more buildings and stored within the BMS device itself. The BMS attributes typically include an 8-character identifier of the point, meter, or controller; a type characteristic (e.g., digital input, digital output, analog input, analog output); alarm conditions; priority characteristics; and status flags. The BMS data provided by a building management system is not stored in a relational database and is not readily available for use by other non-BMS applications. Furthermore, the BMS does not provide or store configuration data (e.g., describing a particular site, a building, a piece of equipment, and/or a point (or meter) on that equipment) that is also of interest to a building operator. As such, a BMS does not facilitate integration of other needed data and services, such as remotely sending alarms to an email address of a building operator or owner to warn of detected problems with a particular piece of equipment in a particular building. This exemplary functionality is generally outside the scope of a BMS.

Because it is desirable to integrate the data and functionality from a BMS with data and functionality available from other systems, additional data, tools and services are needed to more fully meet these requirements. Furthermore, in some circumstances, a building operator may manage a building remotely or contract with a third party building management company to manage multiple buildings at different geographical locations. A need exists for a remotely accessible building information system that supports the integration of new data, tools and services with a building management system. It is also desirable to provide a relational combination of BMS data and configuration data in a building information system to support expanded capabilities exceeding those of a typical building management system.

SUMMARY OF THE INVENTION

In accordance with a preferred embodiment, a method of managing a building information system including a building management system and a building management system network coupled to one or more buildings is provided. Building management system data associated with a piece of equipment on the building management system network is provided. Configuration information associated with the piece of equipment is also provided. A database relationship is established between the building management system data and the configuration information.

In accordance with another preferred embodiment, a computer-readable storage medium storing a data structure for use in a building information system including a building management system program module and a building management system network coupled to one or more buildings is provided. Building management system data is associated with a piece of equipment coupled to the building management system network. One or more building management system database objects stores the building management system data associated with the piece of equipment couple to at least one of the buildings on the building management system network. A building information system configuration object storing configuration information is associated with the piece of equipment. A mapping structure establishes a database relationship between the building management system data of the building management system database object and the configuration information of the building information system configuration object.

In accordance with yet another embodiment. a computer system for managing a building information system, which includes a building management system and a building management system network. is provided. The computer system is coupled to one or more buildings and comprises one or more building management system database objects storing dynamic building management system data associated with a piece of equipment on the building management system network. A configuration database object stores configuration information associated with the piece of equipment. A mapping structure establishes a database relationship between the dynamic building management system data of the building management system database objects and the configuration information of the configuration database object. A processor executes a program module accessing the building management system database object in combination with the configuration database object, based on the database relationship.

DETAILED DESCRIPTION OF THE PREFERRED EMBODIMENT

Figure 1:
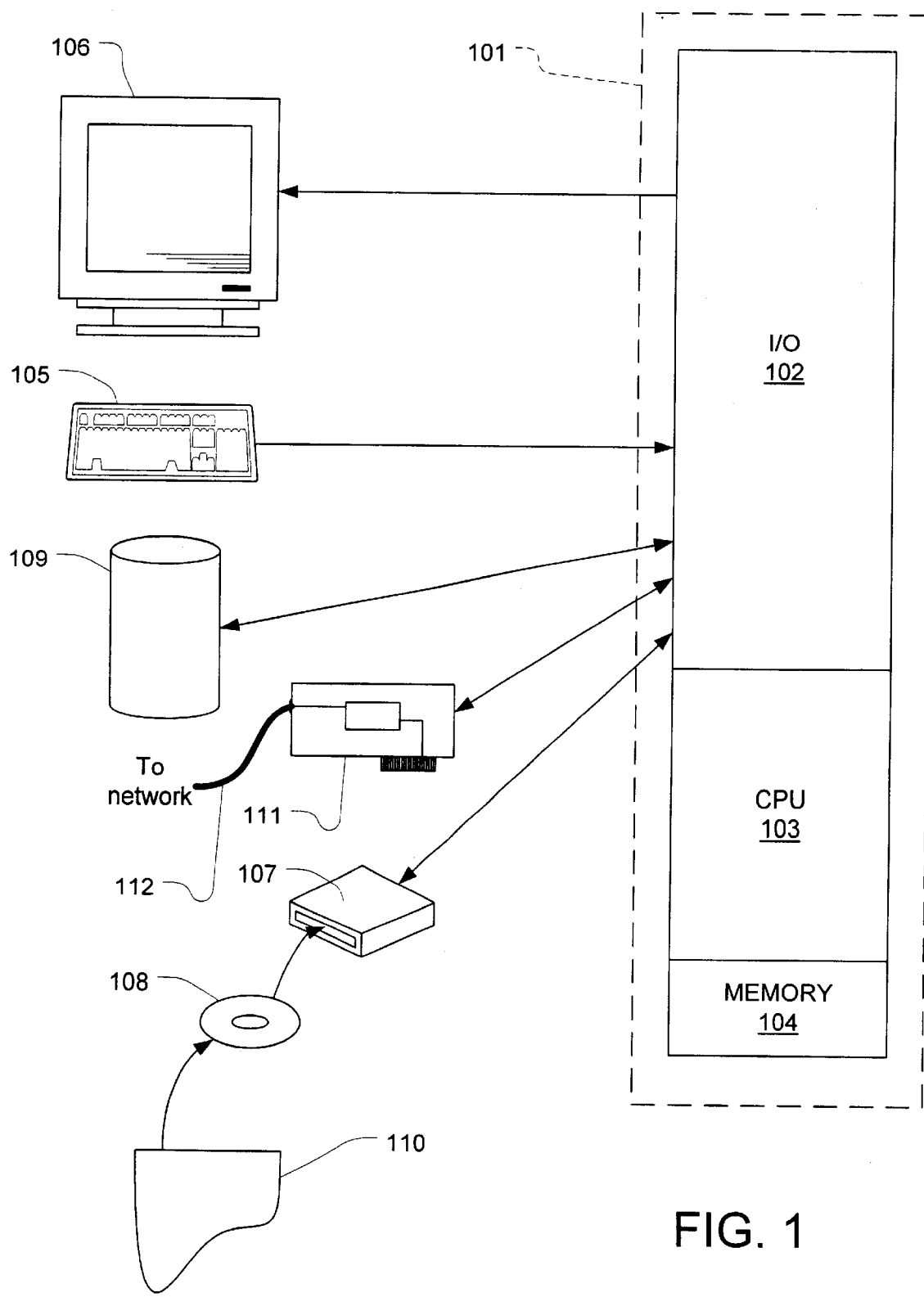
FIG. 1 depicts a general purpose computer that implements the logical operations of an embodiment of the present invention.

FIG. 1 depicts a general purpose computer capable of executing a program product embodiment of the present invention. One operating environment in which the present invention is potentially useful encompasses the general purpose computer. In such a system, data and program files may be input to the computer, which reads the files and executes the programs therein. Some of the elements of a general purpose computer are shown in FIG. 1 wherein a processor 101 is shown having an input/output (I/O) section 102, a Central Processing Unit (CPU) 103, and a memory section 104. The present invention is optionally implemented in software devices loaded in memory 104 and/or stored on a configured CD-ROM 108 or storage unit 109 thereby transforming the computer system in FIG. 1 to a special purpose machine for implementing the present invention.

The I/O section 102 is connected to keyboard 105, display unit 106, disk storage unit 109, and disk drive unit 107. Generally, in contemporary systems, the disk drive unit 107 is a CD-ROM driver unit capable of reading the CD-ROM medium 108, which typically contains programs 110 and data. Computer program products containing mechanisms to effectuate the systems and methods in accordance with the present invention may reside in the memory section 104, on a disk storage unit 109, or on the CD-ROM medium 108 of such a system. Alternatively, disk drive unit 107 may be replaced or supplemented by a floppy drive unit, a tape drive unit, or other storage medium drive unit. The network adapter 111 is capable of connecting the computer system to a network via the network link 112. Examples of such systems include SPARC systems offered by Sun Microsystems, Inc., personal computers offered by IBM Corporation and by other manufacturers of IBM-compatible personal computers, and other systems running a UNIX-based or other operating system. In accordance with the present invention, software instructions such as those directed toward communicating between a client and a server, providing a user interface, and accessing data and services may be executed by CPU 103. Furthermore, program modules, such as services, tools, and applications may be integrated into the system and executed by the CPU 103. Data such as BMS data, including dynamic point and meter data, and configuration data, including polling schedules and utility rates may be stored on disk storage unit 109, disk drive unit 107 or other storage medium units coupled to the system.

Figure 2:
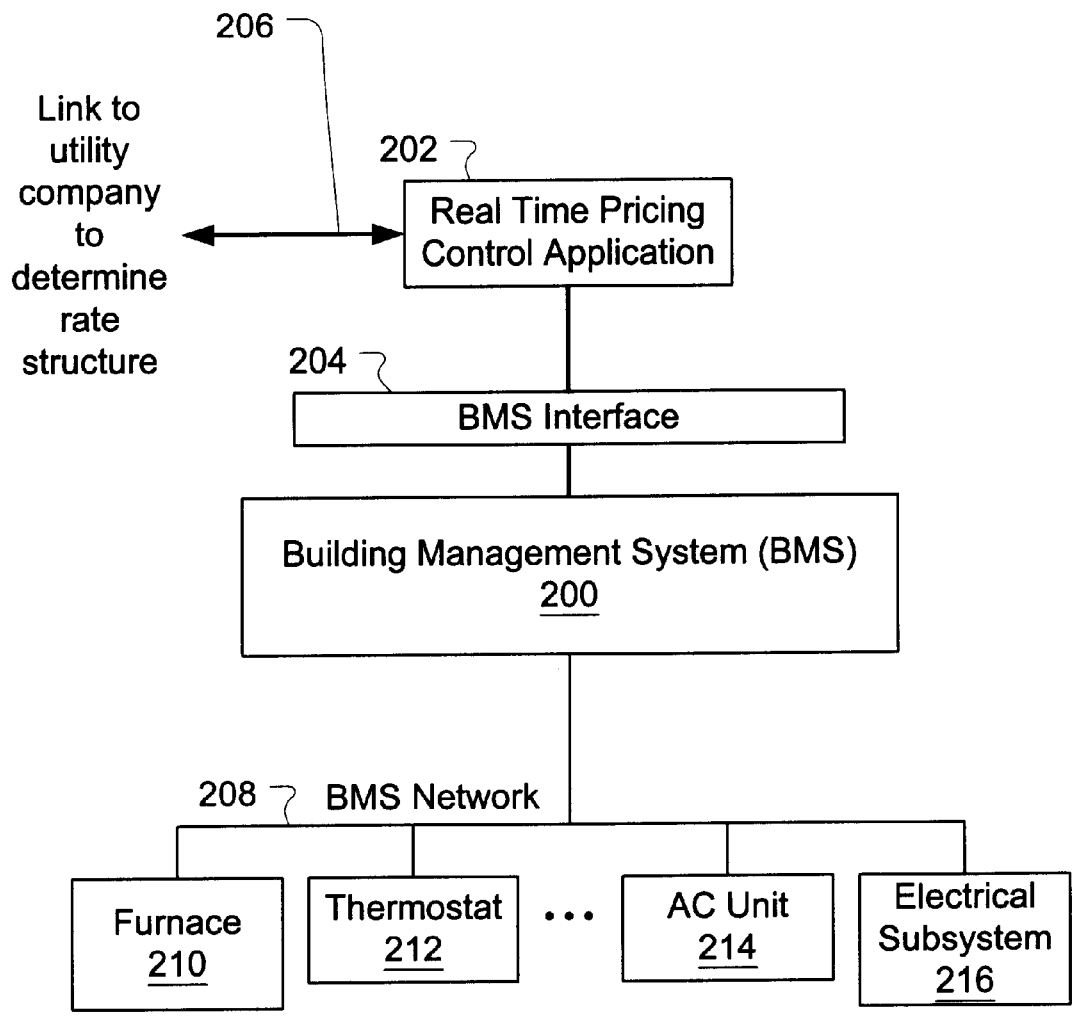
FIG. 2 depicts an embodiment of a building information system in accordance with the present invention.

FIG. 2 depicts a building information system (BIS) including a BMS (building management system) coupled to an RTP (Real Time Pricing) control application in accordance with the present invention. A BMS 200 preferably comprises a personal computer, workstation, or server for executing a building management application. A BMS network 208 preferably couples to points and meters in building subsystems, such as a furnace 210, a thermostat 212, an air-conditioning (AC) unit 214, and an electrical subsystem 216. The BMS 200 provides and records dynamic point and meter data (e.g., building-related dynamic data) in association with point and meter IDs for points and meters located in building subsystems.

In addition, the computer executing the BMS 200 also executes an RTP control application 202 that enables energy service providers (ESPs) to download real-time rates on an incremental or ongoing basis to their customers. The RTP control application 202 is a distinct application from the BMS 200, but it depends on much of the same building-related dynamic data and many of the same interfaces as the BMS 200. The RTP control application 202 interfaces with the BMS 200 through a BMS interface 204 to allow a utility customer to analyze and adjust consumption, as feasible, in order to take advantage of the best utility rates. For example, a power company may charge higher rates during periods of greater demand as a way of encouraging changes in customer consumption, thereby helping the utility to better manage loads. Consequently, the RTP control application 202 allows a utility customer to download real-time rates from the utility company, to analyze its consumption based on the building-related dynamic data received through the BMS, and to adjust its energy consumption accordingly.

A link 206 provides communications to and from an ESP for determining the current rate structure. The ESP typically provides incremental prices (e.g., every hour or every fifteen minutes) to major customers in advance or on a real-time basis. The RTP control application 202 processes the rate data received from the utility in combination with dynamic consumption data, received from the BMS network 208 and recorded by the BMS system 200, to determine what changes should be made to the operation of the building subsystems coupled the BMS network 208. Preferably, data provided by the RTP control application 202 and provided by the BMS 200 is stored in a combined database with configuration data associated with the buildings on the BMS network 208. This integration of data and functionality includes an exemplary embodiment of a building information system. As such, the BMS 200 and RTP control application 202 of FIG. 2 provide for a prompt, automatic, intelligent response that maximizes electrical savings without disturbing normal, effective building operations.

Figure 3:
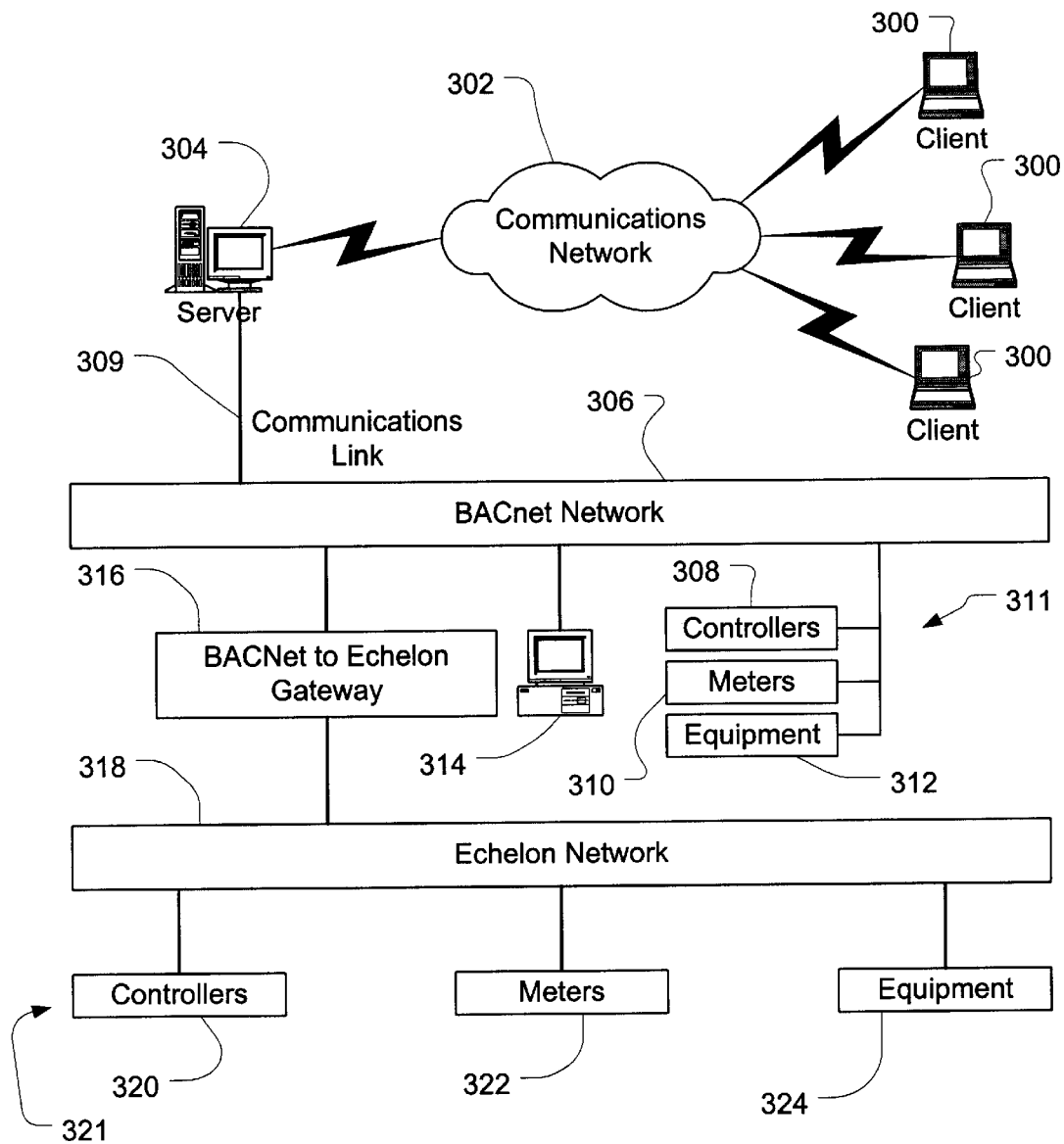
FIG. 3 depicts a network-based system for providing remote access to building management systems for monitoring and control of building subsystems.

FIG. 3 depicts an exemplary embodiment of a remotely accessible building information system that supports the integration of new tools and services. A client computer 300 is coupled to the server 304 via a communications network 302, such as an Internet, an extranet, or an intranet. Other network topologies, including dial-up connections, are also contemplated in accordance with the present invention. The server 304 is configured to communicate with one or more clients 300. Typically, the server 304 can support a number of protocols for communication, such as NetBEUI, NET-BIOS, IPX, TCP/IP, and Packet-Switching.

The server 304 is preferably coupled to a BACnet network 306 or another BMS network, such one supporting CEBus or Echelon. The server 304 can be coupled to the BACnet network 306 by a communications link 309, which may include without limitation a local connection (e.g., a serial cable), a network connection, or a dial-up connection. The controllers 308, the meters 310, and the equipment 312, generally referred to as BACnet-compliant building subsystems 311, are coupled to the BACnet network 306. A BMS 314 is coupled to the BACnet network 306 to monitor and control the BACnet-compliant subsystems 311. The server 304 may also communicate with the BMS 314 to initiate various BMS functions, such as monitoring and control of building subsystems 311.

In addition, the server 304 preferably includes a database associatively storing at least two types of building-related data: (1) building-related BMS data (e.g., from BMS 314 or from an internally executing BMS service) and (2) building-related configuration data corresponding to the building subsystems. Moreover, the BACnet-to-Echelon gateway 316 in FIG. 3 provides an interface between the BACnet 306 and an Echelon network 318. The controllers 320, the meters 322, and the equipment 324, generally referred to as Echelon-compliant subsystems 321, are coupled to the Echelon network 318. In an alternative embodiment of the present invention, legacy (i.e., closed proprietary) controllers may also be coupled to the server 300 through a BACnet-to-proprietary gateway. By virtue of the services and interfaces supported in the server 304, the client 300 connects with the server 304 over the communications network 302 to manage and control the building subsystems (e.g., subsystems 311 and 321) coupled to the BMS or to obtain building-related dynamic data received from the BMS.

Figure 4:
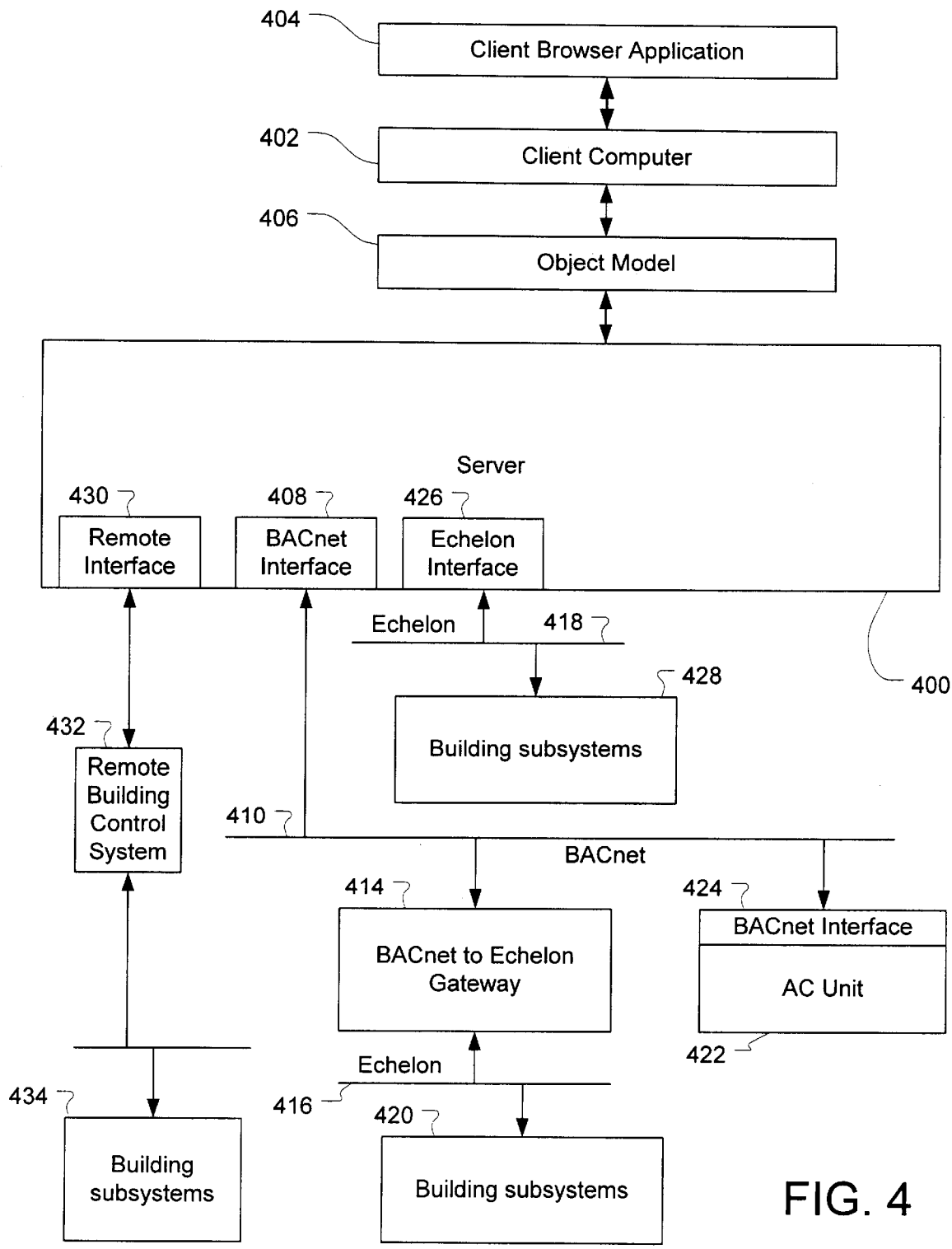
FIG. 4 depicts a block diagram of a client/server system in accordance with the present invention.

FIG. 4 depicts a block diagram of a client/server system in accordance with the present invention. The server computer 400 preferably executes interfaces and other programs that provide access to services and a database storing building-related BMS data and building-related configuration data. The client computer 402 preferably provides a user interface application (e.g., client browser application 404) and other associated applications (such as a report wizard) for accessing the server and monitoring and controlling the building subsystems. The client browser application 404 communicates with the server through a client interface, preferably in the form of an Object Model 406. The Object Model 406 is a client interface to components of the server computer 400, including a server-side client interface, a data interface, a BMS service, a service application, and other programs executing on the server computer 400. A BMS service and a service application preferably include both server processes and client processes.

An Object Model is a model for binary code that enables a programmer to develop an object that can be accessed by any compatible Object Model, service or program. In a preferred embodiment, a Component Object Model (COM), developed by Microsoft Corporation, is used to provide access to other COM-compliant Object Models, including a COM-compliant Object Model in the server 400. The communications between the client computer and the server preferably occur over a communications network, such as the communication network 302 in FIG. 3.

Figure 5:
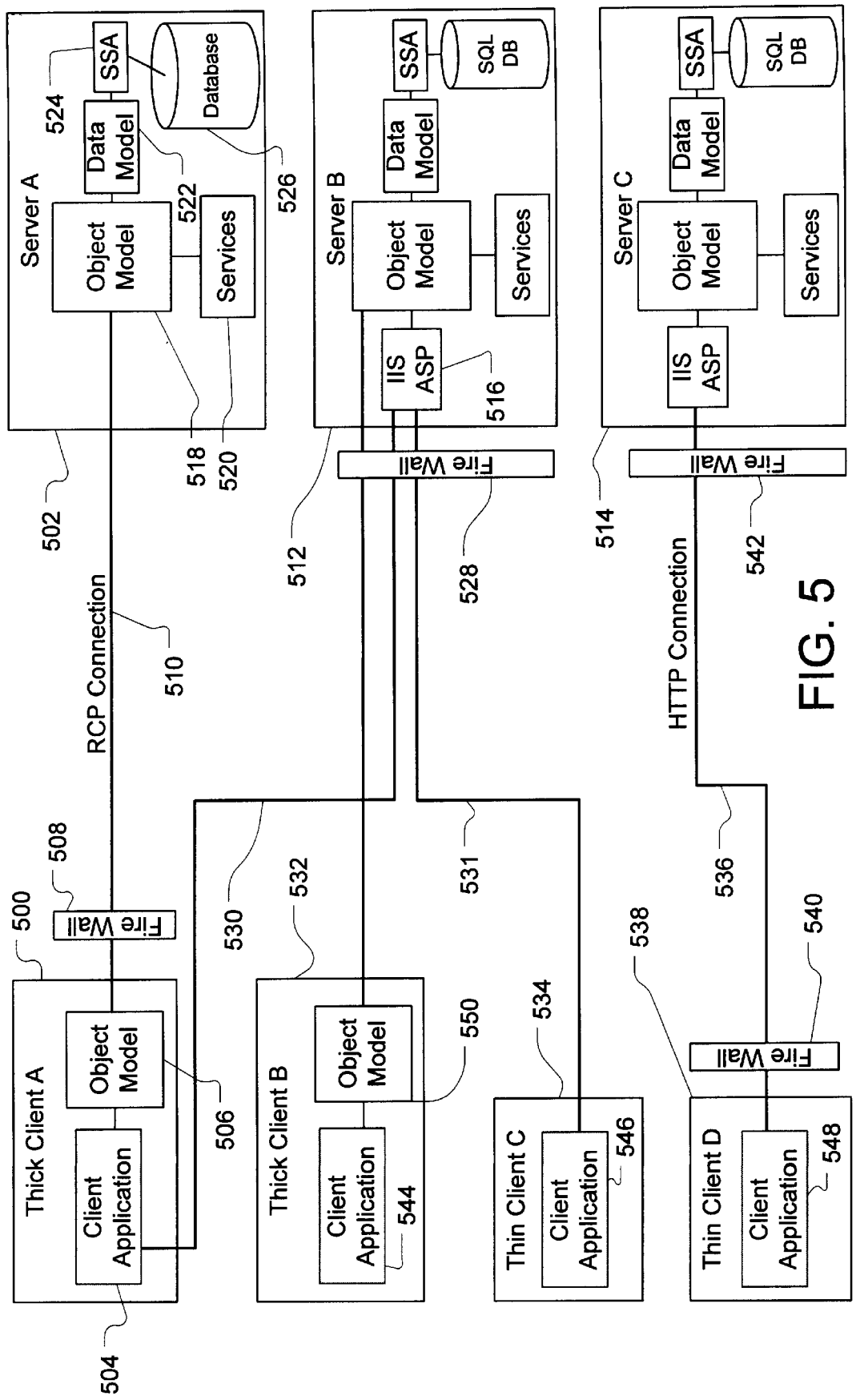
FIG. 5 depicts a topology of multiple clients and multiple servers as supported in an embodiment of the present invention.
Figure 6A:
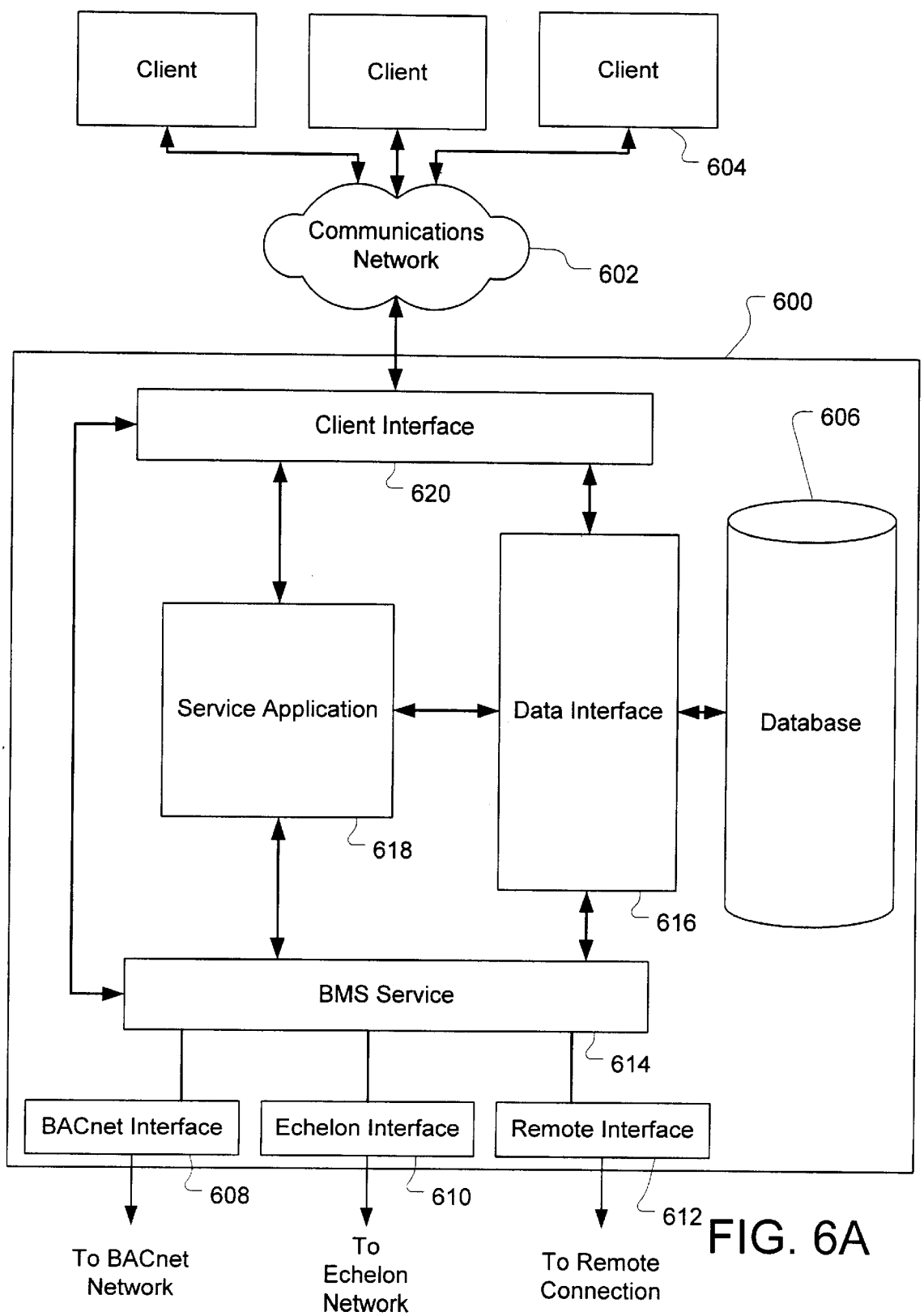
FIG. 6A illustrates a building information system in an exemplary embodiment of the present invention.
Figure 6B:
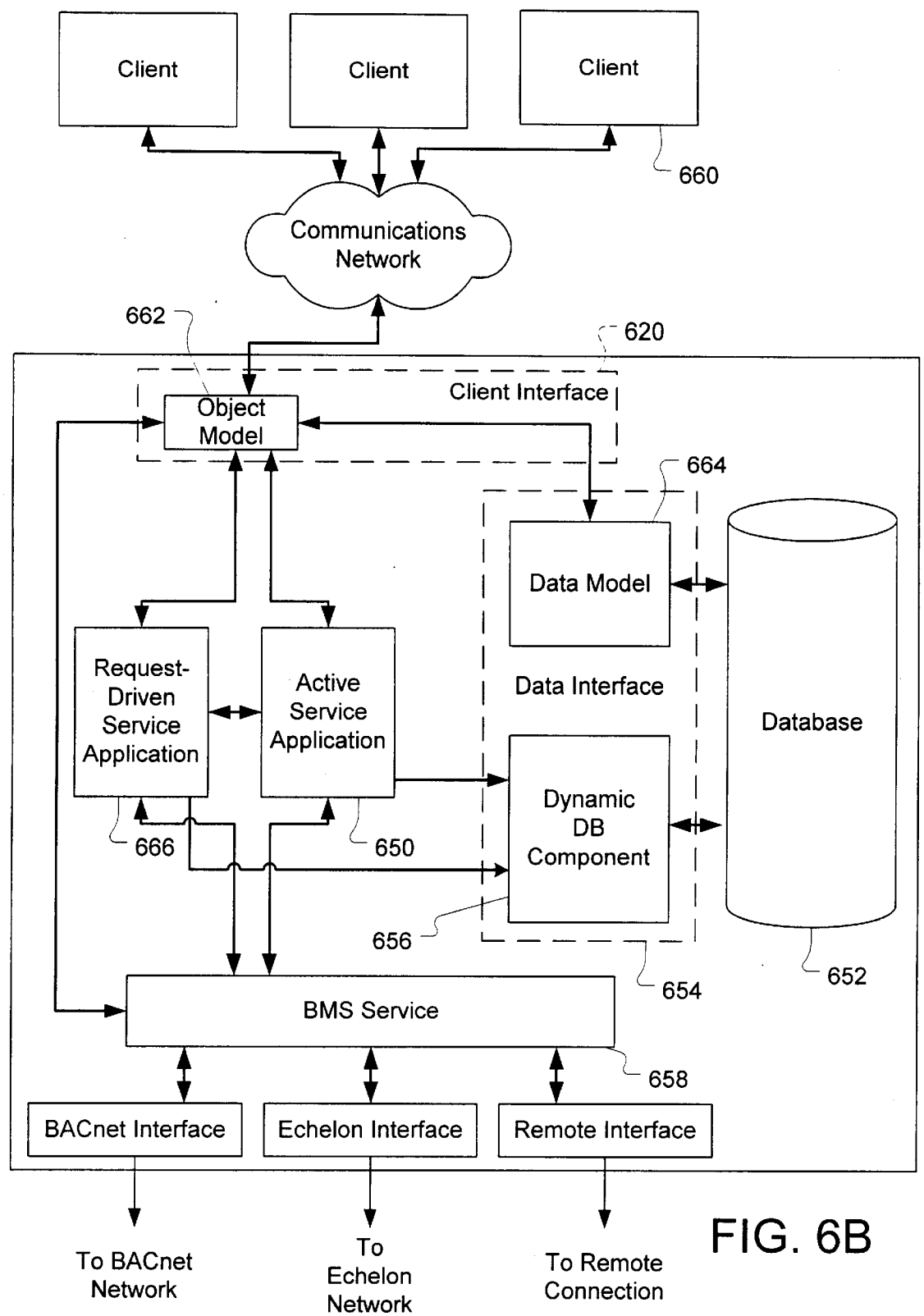
FIG. 6B illustrates a building information system in an alternative exemplary embodiment of the present invention.

The server 400 preferably comprises various services, at least one database, and one or more interfaces to other components of the building system (see FIGS. 5, 6A, and 6B). For example, the server 400 includes a BACnet interface 408 that complies with the BACnet standard and connects with a BACnet network 410. The server 400 also includes an Echelon interface 408 that complies with the Echelon standard and connects to the Echelon network 418. Building subsystems 428 are controlled over the Echelon network 418 and send building-related data back to the server 400. In the illustrated embodiment, the BACnet network 410 is coupled to a BACnet to Echelon Gateway 414 that interfaces to an Echelon network 416. The building subsystems 420 are controlled over the Echelon network and send building-related BMS data back to the server 400. The BACnet-compliant AC (air conditioning) unit 422 includes a BACnet interface 424 that couples to the BACnet network 410. The AC unit 422 sends building-related BMS data to the server 400. The server 400 also includes a remote interface 430 for coupling to other remote building control systems. For example, if the remote interface 430 is a dial-up interface, the remote building control system 432 includes a modem server for establishing communications with the remote interface 430. The server 400 can then monitor and control the building subsystems 434 in the remote building through a BMS service application executing in the server 400.

FIG. 5 depicts topologies of multiple clients and multiple servers as supported in an embodiment of the present invention. A client/server architecture is a system in which each computer or process on a network is either a "client" or a "server". Generally, a server is a process or computer that provides some service to other (client) processes or computers. For example, the BMS service and various service applications of the embodiments of the present invention include components that perform server processes for client processes within the system. Likewise, components of a client application, the BMS service and the various service applications also perform client processes. Clients are generally applications that rely on servers for processing and/or resources, such as files or devices. The connection between a client and a server is normally by means of message passing, often through a program interface or over a network employing a protocol to encode the client's requests and the servers' responses. The server may run continuously, such as a daemon or an NT service (i.e., active services), or await requests from other components (i.e., request-driven services).

The thick client A 500 represents a "fat client" in the client/server architecture. Generally, a fat client is a client that performs large portion of the data processing operations,. and the processed data is stored on the server, such as server A 502. The thick client A 500 comprises a client application 504 and a client-based Object Model 506. The client-based Object Model 506 provides an interface to the data, tools, and services on the server 502. The thick client A 500 communicates with server A 502 through a firewall 508 over communications link 510 using a remote procedure call (RPC) protocol. Generally, a firewall is a system designed to prevent unauthorized access to or from a private network. Firewalls can be implemented in both hardware and software, or a combination of both. Firewalls are frequently used to prevent unauthorized Internet users from accessing private networks connected to the Internet (especially intranets). All messages entering or leaving the intranet pass through the firewall, which examines each message and blocks those that do not meet the specified security criteria.

The server A 502 preferably includes a server-side Object Model 518, at least one services module 520, a Data Model 522, a storage system architecture (SSA) interface 524, and a database 526 residing on one or more storage media. The Object Model 518 is a server-side embodiment of an Object Model, similar to the client-side Object Model 506 in the client. The services 520 preferably include at least one software module for performing services, such as monitoring meters, computing rates and consumption, and polling points within the building system.

Generally, a Data Model is a set of tools to describe data, data relationships, and data constraints in the database 526. The SSA interface 524 preferably complies with an IBM proposed ANSI (American National Standards Institute) standard for standard-high speed interface to disk clusters and arrays. SSA allows full-duplex multiplex serial data transfers at rates of 20 megabits per second in each direction. The database 526 is preferably a structured query language (SQL) database for storing data relating to one or more buildings monitored and controlled by the building management system. The thick client A 500 is also coupled through firewall 528 to server B 512 using a hypertext transfer protocol (HTTP) link 530. The server B 512 also supports an RPC connection with the thick client B 532, which includes a client application 544 and a client-side Object Model 550, and HTTP connection 531 with a thin client C 534, which includes a client application 546. Generally, a thin client is a client in which much of the processing occurs at a server. The server B 512 preferably includes the same components as server A 502.

In FIG. 5, a server C 514 is also preferably coupled by an HTTP connection 536 to a thin client D 538, which preferably includes a client application 548. As shown, firewalls 540 and 542 are positioned between the thin client D 538 and the server C 514. The server C 514 preferably includes similar components to servers A and B. In servers B 512 and C 514, HTTP connections are coupled through an Internet information server ("IIS") active server page ("ASP") 516, which is a web server that runs on a Windows NT platform. Other web server implementations may also be employed in accordance with the present invention. The term "ASP" refers to a specification for dynamically created web pages with a ASP extension that contain Microsoft Visual Basic code, Jscript code, or other dynamic web page generation elements. Although ASP technology is employed in an embodiment of the present invention, alternative web page creation techniques are also contemplated within the scope of the present invention.

FIG. 6A illustrates a building information system in an exemplary embodiment of the present invention. The server 600 is coupled to communications network 602, through which one or more client computers may access the server 600. Preferably, such a client 604 accesses the server 600 via an HTTP or RPC connection, although other client/server connection means are contemplated within the scope of the present invention. The client 604 preferably executes a browser application and other tools to facilitate the user's communication with the server and manipulation of data stored within the server.

The server 600 preferably includes a database 606 for storing building-related BMS data received from building subsystems (not shown) across a network, such as a BACnet network, an Echelon network, or other remote connections. The database 606 also includes building-related configuration data relating to the building subsystems coupled to the network. Preferably, the building-related BMS data and the building-related configuration data are combined in a relational database such that the BMS data related to a particular point is associated with, for example, the corresponding building, building owner, equipment, and other configuration elements. To support a connection to a BMS network, a network interface is developed for the corresponding network (see interfaces 608, 610, and 612). Other proprietary networking protocols, such as CBUS from Honeywell, Inc., and other non-proprietary networking protocols, such as CEbus, may also be supported. A published and consistent interface to the BMS service 614 facilitates integration of these new interfaces.

The server 600 includes the BMS service 614 that preferably provides generic BMS functionality on the server-side, including the functionality to read/write points and BMS attributes (e.g., point attributes), to discover building subsystems, and to discover objects (e.g., sensors, actuators, and meters) in building subsystems. The BMS service 614 also supports multiple BMS network interfaces, including a BACnet interface 608, an Echelon interface 610, and a remote interface 612. The BMS service 614 also communicates through a data interface 616, which preferably includes a Data Model (see 522 in FIG. 5). The data interface 616 abstracts database access functionality to the BMS service 614, one or more service applications 618, and a client interface 620, which preferably includes an Object Model (see 518 in FIG. 5). Generally, the abstraction provides a consistent interface that preferably simplifies or automates access to an underlying database or object structure.

The service application 618 preferably comprises a Window NT service (i.e., an active service) or other component (i.e., a request-driven component), such as a service provided by a Microsoft Transaction Server (MTS), for servicing client commands, accessing the database 606, and communicating with building subsystems. The service application 618 is configured to communicate with the client 604 via the client interface 620. In an embodiment of the present invention, the service application 618 is also configured to access the database 606 through data interface 616 and/or through a combination of the client interface 620 and the data interface 616.

The architecture of the system illustrated in FIG. 6A facilitates integration of additional BMS network interfaces (such as BACnet interface 608), services (such as service application 618), and clients and associate tools (such as client 604). The published and consistent interfaces presented by the client interface 620, the data interface 616, and the BMS service 614 provide developers with means to develop these new components to work with the existing system. As such, in contrast to dedicated BMS systems, additional tools can be added to the system to provide functionality beyond generic BMS functionality. In addition, the architecture provides remote accessibility across a communications network. Furthermore, security can be enforced upon these additional components (e.g., clients, services, and BMS network interfaces) by the interfaces (e.g., client interface 620, data interface 616, and BMS service 614) within the server 600.

FIG. 6B illustrates a building information system in an alternative exemplary embodiment of the present invention. An active service application 650 preferably interfaces with the database 652 through the data interface 654, and specifically through the dynamic database (DB) component 656, to store dynamic data in the database 652. An active service application typically has its own sense of time, such as a Windows NT service. Generally, the dynamic DB component 656 abstracts database update/write/delete operations. In addition, the dynamic DB component 656 provides services to internal server components and, preferably, its interfaces are not published to external clients.

In an embodiment of the present invention, the active service application 650 and the BMS service 658 can also access the clients (such as client 660) and data in the database 652 through the Object Model 662. Preferably, certain data accesses by an active service application, such as a polling service's request for polling frequencies, are also communicated through the Object Model 662 in the client interface to the Data Model 664 to access data in the database 652.

In the exemplary embodiment of FIG. 6B, the request-driven service application 666 (e.g., the meter-BMS client 910 of FIG. 9) interfaces with the client interface 620 and the BMS service 658 and has access to the database 606 through the dynamic DB component 656. The request-driven service application 666 accesses the database 652 through the Object Model 662 in the client interface 620 and the Data Model 664 in the data interface 654. Furthermore, the request-driven service application 666 can also store dynamic data to the database via the dynamic DB component 656.

Figure 7:
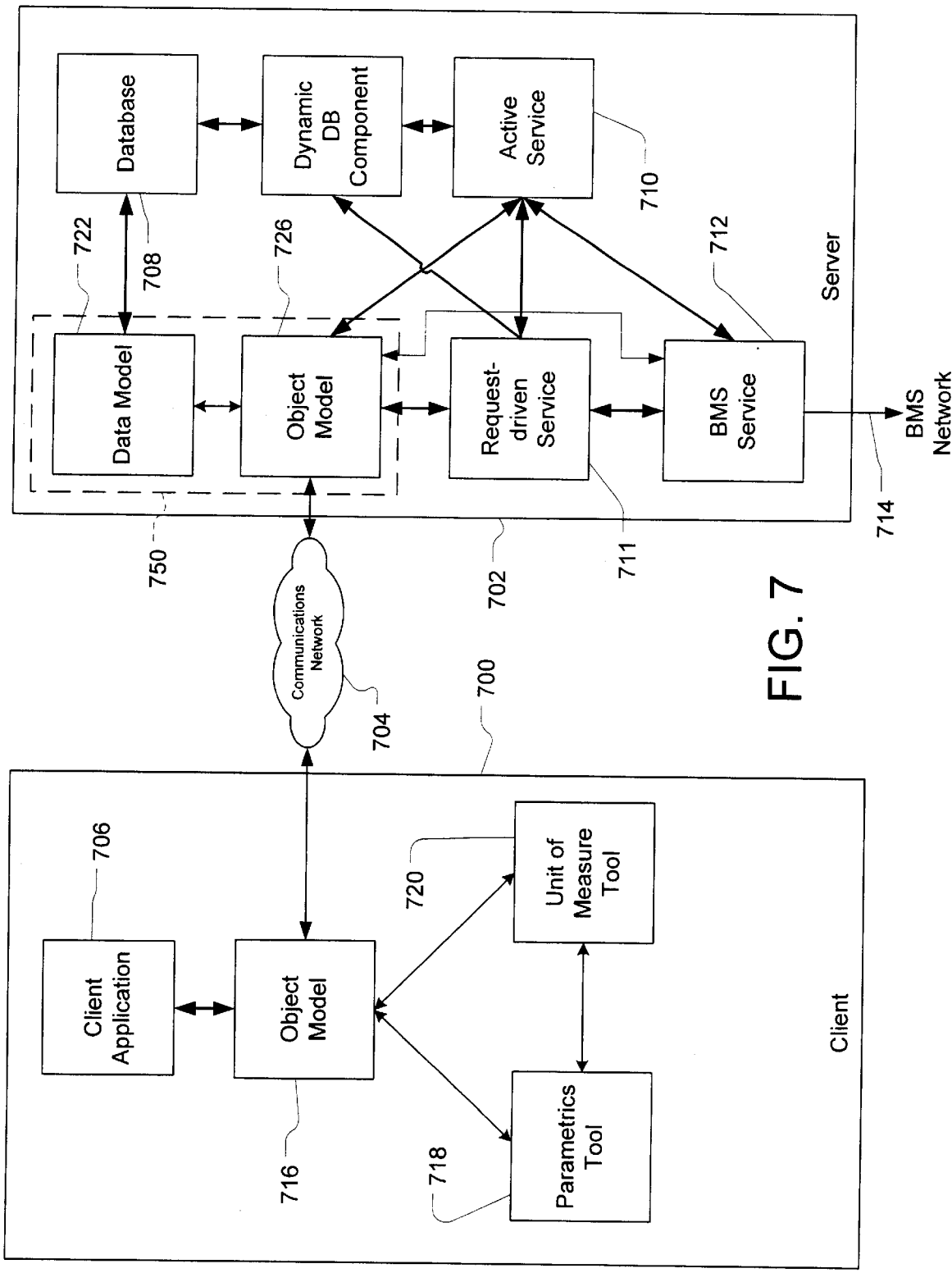
FIG. 7 depicts multiple client/server system topologies in accordance with the present invention.

FIG. 7 depicts a client/server system in accordance with the present invention. A client 700 is coupled to server 702 by communications network 704. Preferably, the communications network 704 includes an Internet, an intranet, or an extranet. The client 700 preferably includes a client application 706, such as a browser for browsing data in database 708, for accessing services such as the active service 710, request-driven service 711, and the BMS service 712, and for monitoring and controlling equipment coupled to the server 702 via the BMS interface 714. The client application 706 interfaces with the server 702 via the client-side Object Model 716.

The parametrics tool 718 takes time series data (e.g., building-related dynamic BMS data, such as meter readings at 15 minute intervals) and interpolates, extrapolates, averages or otherwise process the data to determine estimated readings for times between or outside of the actual reading events. When data is requested that does not correspond to an actual reading event, the parametrics tool 718 determines, based on the units of measure associated with received data, whether estimation is appropriate. For example, consumption data can be evaluated based on a peak reading over a period of time, rather than on an estimated reading at a specific moment in time. Therefore, for a particular embodiment of the present invention, the parametrics tool 718 is configured to recognize consumption data (based on its units of measure) and to pass the consumption data without estimating a peak value. A units of measure tool 720 can be invoked to convert building-related dynamic data from one unit of measure to another (e.g., degrees Fahrenheit to degrees Celsius). In an alternative embodiment, the parametrics tool 718 and the units of measure tool 720 may be executed by a server computer.

The Data Model 722 provides an interface for accessing and manipulating data in the database 708. Client applications preferably access the Data Model 722 through a server-side Object Model 726. The combination of the Data Model 722 and the Object Model 726 is referred to as the "DB component", as indicated by reference numeral 750. It is to this component, for example, that other COM-compliant client applications and services can be interfaced into the overall client-server architecture.

The Object Model 726 also provides the necessary functionality for clients to access underlying building-related BIS information (both building-related BMS data and building-related configuration data). For example, the Object Model 726, through communications with the BMS service 712, provides necessary methods for discovering devices and points, mapping such points to equipment, getting point data, setting sampling frequencies for points and setting sampling frequencies for a point or points based on multiple-client user access to a common point. The BMS service 712 preferably provides generic BMS functionality on the server-side to read/write points, to discover devices, discover objects in devices, and to read/write point attributes by interfacing with building subsystems on the BMS network.

In an embodiment of the present invention, the mapping of points is accomplished using a list of discovered BMS points (i.e., point identifiers preferably compiled through automatic point discovery) and schematics representing predetermined equipment and associated point locations (i.e., "hotspots") throughout the BMS network. A user accesses this data through a client-based user interface application. The hotspots are represented by visual cues (e.g., active square or circular locations on the schematic of a piece of equipment) displayed on the client. If the mouse pointer hovers over one of the visual cues, a description of the hotspot is displayed. The hotspot description is typically something a user can identify (e.g., "Chilled Water Inlet Temperature") rather than a cryptic 8-character BMS identifier.

The user graphically selects one of the discovered points from the list and then selects a hotspot on a schematic of a piece of equipment on the BMS network. In an alternative embodiment, the hotspot may be selected first, followed by the point from the list. This process configures a mapping structure in the database that establishes a database relationship between the BMS point objects (and associated BMS data) and the configuration information associated with the piece of equipment (e.g., location of the point, operational characteristics of the equipment, location of the equipment, owner of the equipment, etc.). A BIS service executing in the building information system can use the BMS data and configuration information in combination to perform variety of functions, including scheduling point and meter polling, calculate power consumption, calculate utility costs, detect and characterize point discovery mismatches, and detect and communicate alarm conditions.

The active service 710 may, for example, be embodied by a polling service that is responsible for getting dynamic point data from the BMS into the database 708. Preferably, the active service 710 runs as a Windows NT service. On startup, a polling service preferably retrieves all mapped points configured in the BMS along with a designated sampling frequency and point type. A polling service preferably sets up polling for active points (i.e., those points for which polling is enabled and selected). The polling service responds to polling frequency changes, changes to the polling on/off state (also referred to as the polling enable state), and changes to the mapped point configuration through a Windows NT event, based on configuration data in the database 708. Such changes are also reflected in an update to a cached list of points maintained in the polling service or database 708.

Preferably, a polling service supports the monitoring of multiple, different points on the one or more BMS networks. An embodiment of a polling service preferably spreads different point reads apart within a specified polling interval so as to limit the load on the BMS network. Alternatively, if the points are located on different BMS networks (see the multiple BMS networks of FIG. 4), the polling service preferably group-schedules the multiple point reads closer together to minimize the frequency of inter-network or dialog communication. Point read failures are communicated using an alarms component. The polling service reads point data using the BMS service 712. The polling service 710 also uses a dynamic DB component to write dynamic BMS data into the database, although other means of accessing the database 708 are also contemplated within the scope of the present invention.

Figure 8:
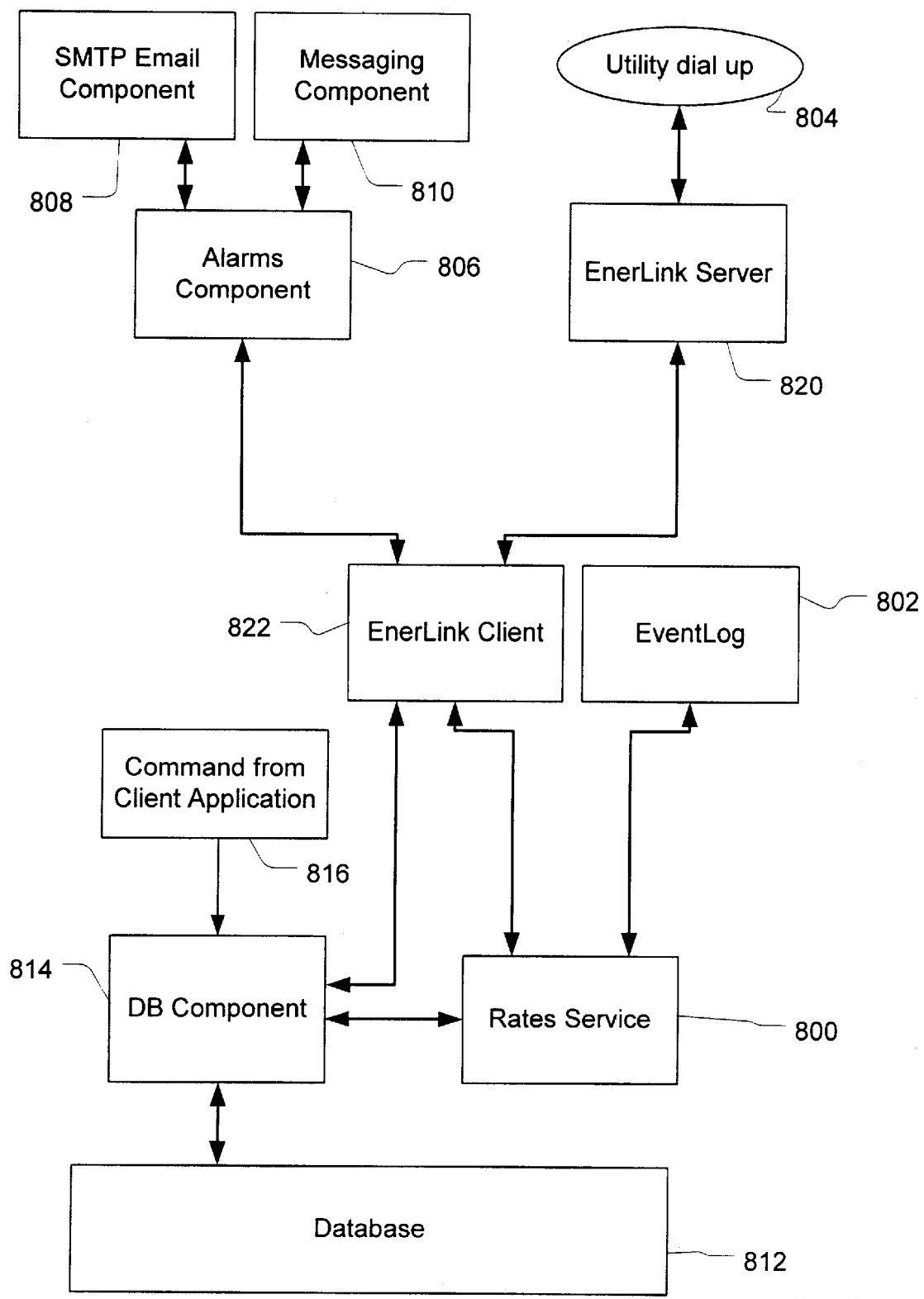
FIG. 8 depicts system components associated with a rates service in an embodiment of the present invention.

FIG. 8 depicts system components associated with a rates service in an embodiment of the present invention. Preferably, a rates service 800 is a Windows NT service that is responsible for periodically collecting real-time rates by interfacing with an underlying client for rate data from an ESP. The rates service 800 accesses the database 812 via the DB component 814 to store downloaded utilities rates (i.e., exemplary configuration data) and consumption data (i.e., exemplary BMS data). The rates service 800 is also configured to interface with multiple clients for different rate services, to retry rate collection in case of failures, and to set default rates in case of a failure to collect rates after a specified number of retried counts. The rates may be actual or predicted rates. Generally, clients access the database 812 through a DB component 814, as shown by the command 816 from a client application. The event log component 802 provides interfaces that abstract writing events to the Windows NT event log. Furthermore, the events can be reviewed through the Windows NT event viewer.

The EnerLink client 822 is one example of a rate source through which rates can be obtained. The EnerLink client 822 communicates with EnerLink Server 820, which provides the processing required to connect with and extract real-time prices from the ESP. A dial-up interface 804 provides an example of a means to connect with the utility to obtain real time pricing data, although other means, including the Internet and extranet or other connection means are contemplated within the scope of the present invention.

In case of a failure to obtain rates, the EnerLink client 822 is configured to dispatch an alarm through an alarms component 806. The alarms component 806 can dispatch alarms through an SMTP e-mail component 808 to send alarms by e-mail. More generally, error messages can be communicated using message component 810, such as by pop-up system messaging. The configuration information stored in the database 812 preferably includes contact information, such as a contact phone number or email address, used to communicate the alarm to designated personnel. The alarms component 806 can obtain the contact information through the DB component 814 and forward the alarm as directed. In another embodiment of the present invention, such contact information also includes an indicator of the preferred communication means for alarms relating to a given piece of equipment. The rates service 800 and the EnerLink client 822 are preferably both configured to access the database 812 through DB component 814.

Figure 9:
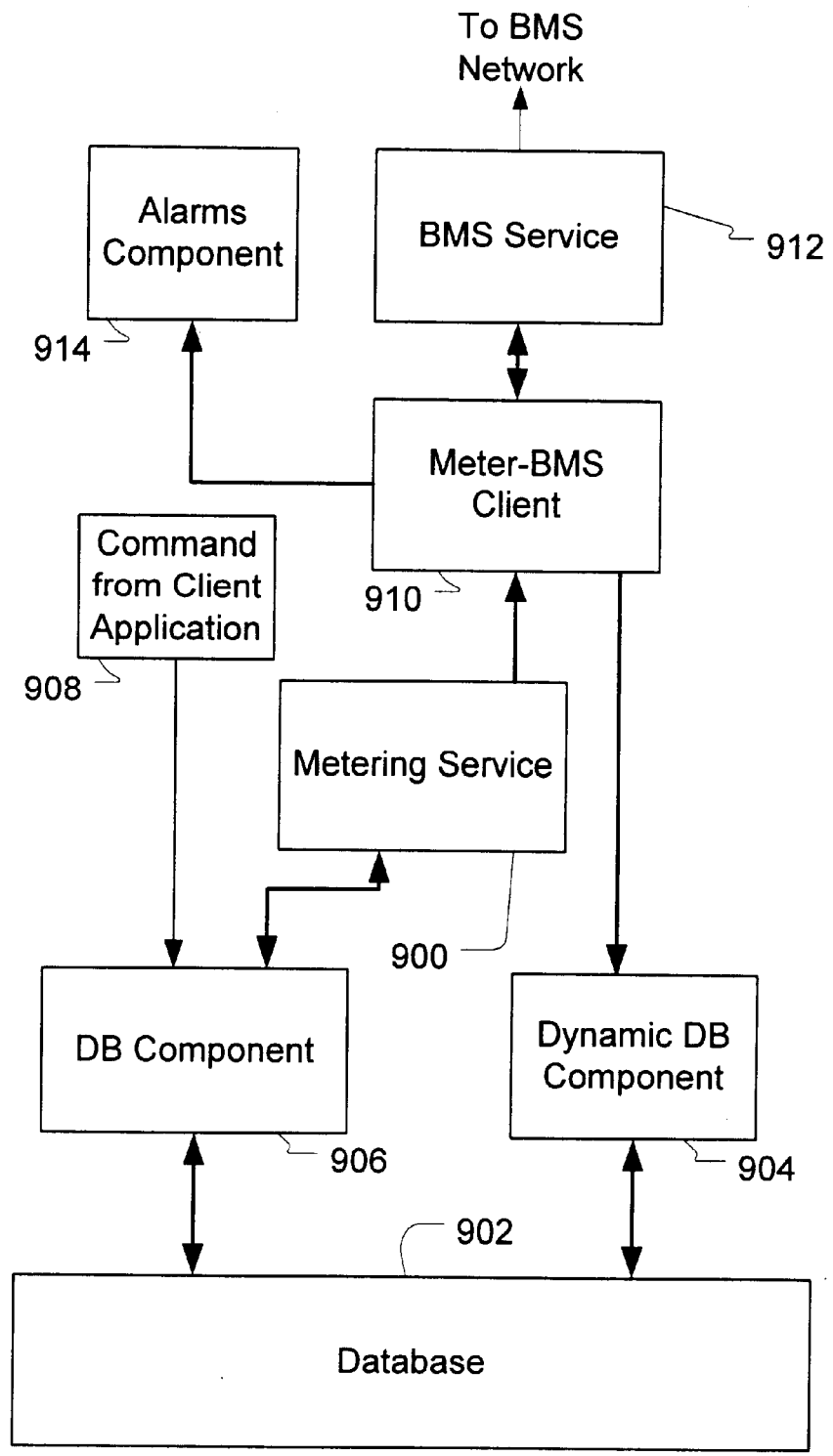
FIG. 9 depicts system components associated with a metering service in an embodiment of the present invention.

FIG. 9 depicts the components employed to support a metering service in accordance with the present invention. Preferably, the metering service 900 is an active service application, implemented as a Windows NT service. A metering service 900 is responsible for reading the meter data based on configuration information in a database 902. To accommodate different types of meters, the metering service 900 updates dynamic meter data in the database 902 via a meter-BMS client (a request-driven service application), which accesses the database 902 via a dynamic DB component 904. Furthermore, the metering service 900 also accesses configuration data in database 902 via a DB component 906, which preferably comprises an Object Model and a Data Model. A command 908 from a client application is communicated through the DB component 906 to access meter data in the database 902.

The metering service preferably provides functions for querying for a list of meters that are to be read; using the services of the DB component 906; segregating the list of meters based on meter types (BMS, CEBus, and others); scheduling the meter list of clients so that the meter reading intervals are spread evenly among the meters; maintaining the schedule list; polling at regular intervals the meter list maintained for each of the clients to determine whether there are any meters to be read; sending to each client a list of meters to be read on that client; waiting for configuration modification notifications; and modifying meter data in the meter list stored in the database 902. The metering service 900 accesses the BMS service 912 through the meter-BMS client 910. The meter-BMS client 910 provides necessary functionality for retrieving meter data (i.e., by reading the meter) from different types of meters that are connected to the BMS network. The meter-BMS client 910 can also initiate alarms through the alarm component 914 and is configured to compute consumption, demand, and other meter-related characteristics based on pulse count in accordance with predetermined algorithms. In an alternative embodiment, the data interface includes the functionality for computer consumption, demand, and other meter-related characteristics.

Figure 10:
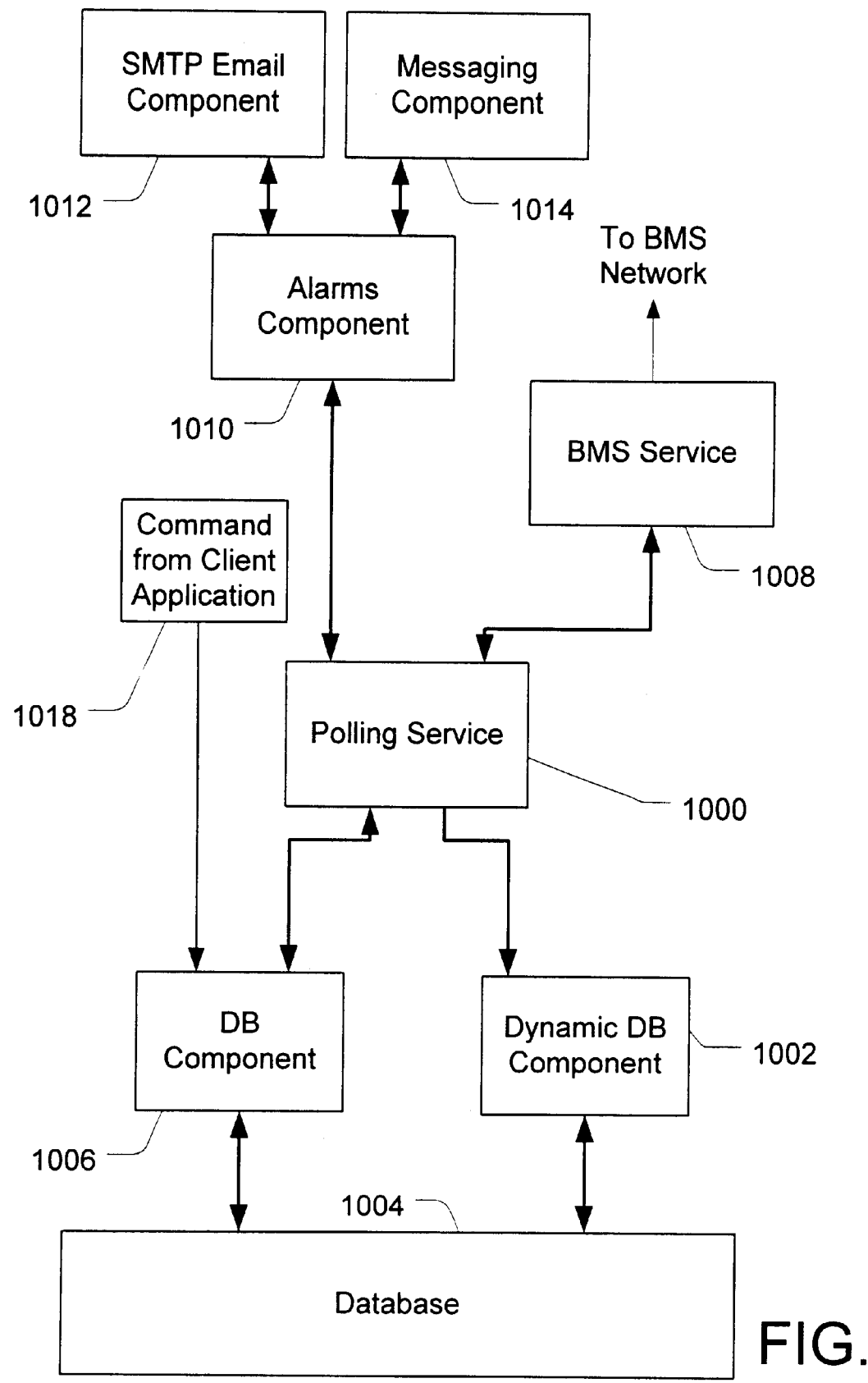
FIG. 10 depicts system components associated with a polling service in an embodiment of the present invention.

FIG. 10 depicts components employed to support a polling service in accordance with the present invention. The polling service architecture is responsible for getting dynamic point data from a BMS service 1008 and recording it into a database 1004. Preferably, the polling service 1000 is an active service application, implemented as a Windows NT service. On startup, the polling service 1000 retrieves all mapped points configured in the database 1004 along with each point's sampling frequency, polling enable state, point type, and other relevant data. The polling service 1000 configures polling for active points (i.e., those points for which polling is enabled). Generally, polling involves requesting point data from the BMS service 1008 at a predetermined frequency or on a time schedule. When the BMS service 1008 responds with the requested data, the polling service 1000 records the dynamic point data in the database 1004 via the dynamic DB component 1002. The polling service 1000 distributes point read calls to the BMS service 1008 over a designated frequency period. The polling service 1000 also responds to polling frequency changes, changes to polling enable states, and mapped point configuration changes. Such changes are initiated by command 1018 from a client application, either on a separate client computer or a client application internal to the server. Such changes are communicated by a Windows NT event to which the polling service 1000 responds and updates the cache list of points. The command 1018 is communicated through DB component 1006 to make changes to the point data stored in the database 1004.

If a point read failure occurs, the polling service 1000 communicates the failure to other components in the system using an alarms component 1010. The alarms component preferably obtains a recipient list according to an identifier associated with the particular alarm. In an embodiment of the present invention, the recipient list is stored as configuration data in the database 1004 and includes fields associated with the names of one or more recipients, an indicator of the preferred alarm communication method (e.g., e-mail, fax, pager, or event log), a textual, tactile, graphical or auditory message to be communicated to the recipient, and a time schedule indicating when the recipient should receive an alarm communication. For example, a recipient who works during a first shift may have a time schedule indicating that they are to receive alarms from seven o'clock to four o'clock Monday, Tuesday, Wednesday, Thursday and Friday.

The alarm functionality and the configuration data from the database 1004 on which it relies, provide an excellent illustration of the advantages provided by combining BMS data with building-related configuration data. Whereas in a standard BMS system, a limited scope and quantity of BMS data is associated with a specific point or meter (e.g., as identified by the point attributes), the building information system of the present invention relates the BMS data to real-world configuration data that allows information calculations and other functionality to be integrated for the benefit of the building operator. For example, if configuration data includes layout data regarding an air conditioning unit having current sensor, the power consumption for the air conditioning unit can be calculated by the building information system. The layout data (i.e., also exemplary configuration data) preferably indicates the supply voltage level, or the identity of the voltage source coupled to the air conditioning unit and, therefore, allows the building information system to calculate power consumption from the detected current value and the supply voltage determined from the configuration data (power=voltage times current).

The alarms component 1010 communicates an alarm via an SMTP e-mail component 1012 or via a messaging component 1014. The SMTP e-mail component 1012 is an in-proc DLL that can send e-mail messages to one or more recipients. This component uses sockets and an SMTP host to send an e-mail. Preferably, the SMTP mail component 1012 is an active server page (ASP) component employing a MAPI (Messaging Application Programming Interface) service, which is a service built into Microsoft WINDOWS NT that enables different email applications to work together to distribute email. As long as both applications are MAPI-enabled, they can share mail messages with each other. Alternative messaging services are also contemplated within the scope of the present invention to support the Microsoft WINDOWS platforms and other platforms, including SOLARIS and LINUX. The messaging component 1014 provides necessary services to send messages, including e-mail, pages, faxes, or entries in an event log.

Figure 11:
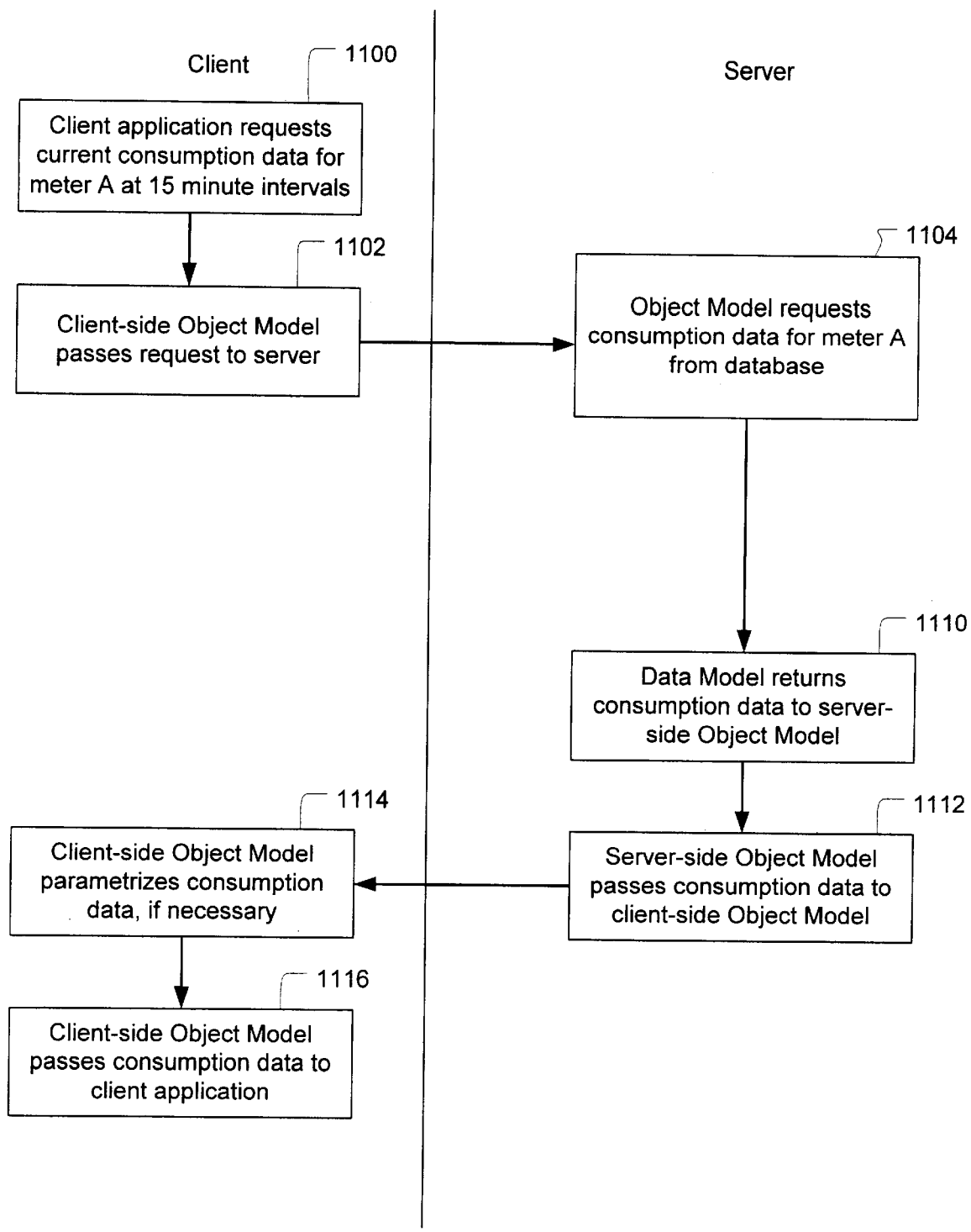
FIG. 11 depicts a flowchart of communications relating to a request for dynamic meter data in an embodiment of the present invention.

FIG. 11 depicts a flowchart of communications relating to a request for dynamic meter data in an embodiment of the present invention. The left side of FIG. 11 relates to operations preferably occurring in a client, such as client computer 402 in FIG. 4. The right side of FIG. 11 corresponds to operations occurring on a building information server, such as server computer 400 in FIG. 4. It is assumed that a metering service was previously instructed to request consumption data for meter A from a BMS service, such as the BMS service 614 in FIG. 6A, at 15 minute intervals. The BMS service retrieves the consumption data from meter A on the BMS network at the appropriate interval and dynamically loads it into a database.

In operation 1100, a client application requests current energy consumption data relating to meter A. Meter A represents a meter coupled to a BMS network attached to the server. In operation 1102, the request is passed by a client-side Object Model to the server. In operation 1104 on the server-side, a server-side Object Model receives the request from the client-side Object Model and requests the energy consumption data for meter A from the database.

Preferably, the dynamic meter data is stored in the database in accordance with read requests by a metering service. For example, prior to the client request of 1100, the client application requested that a meter reading frequency of ten minute intervals be configured for meter A. The request was passed through the Object Models and the ten minute interval was stored in the database. The metering service accesses the database and determines that a meter reading frequency has been configured for meter A. Thereafter, the meter service causes the BMS service to read the meter A at ten minute intervals. The dynamic data result from each meter reading is then loaded by the BMS server through the dynamic DB component into the database. Once in the database, the dynamic data can be retrieved by the client application in accordance with the flowchart of FIG. 11.

In operation 1110, a Data Model retrieves the consumption data from the database and returns it to the server-side Object Model. In operation 1112, the server-side Object Model passes the consumption data to the client-side Object Model. In operation 1114 on the client-side, the client-side Object Model passes the consumption data to the parametrics tool (see parametrics tool 718 in FIG. 7). Typically, the parametric tool is used to interpolate between individual meter reads (such as meter reads spaced at fifteen minute intervals) to estimate consumption at smaller time intervals. For example, in operation 1116, the client-side Object Model passes the consumption data to a client application, which preferably displays the consumption data to a user or otherwise operates on it.

Figure 12:
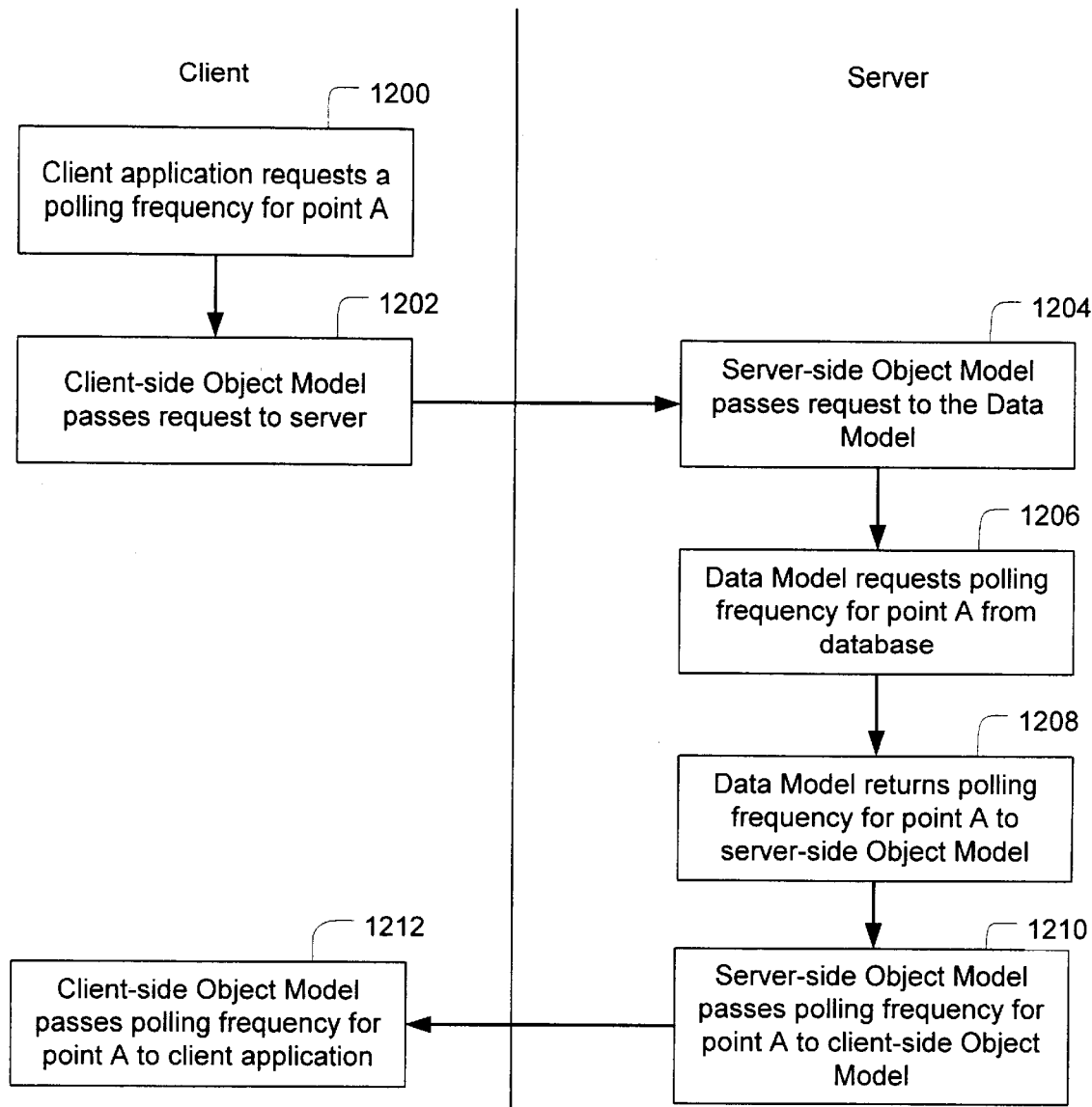
FIG. 12 depicts a flowchart of communications representing a request by a client application for configuration data from a database in an embodiment of the present invention.

FIG. 12 depicts a flowchart of communications representing a request by a client application for configuration data from a database in an embodiment of the present invention. In operation 1200, the client application obtains a polling frequency value of point A from a sampling frequency object. In addition to configuration data such as a polling frequency, other data, including without limitation, the owner of the building, the building location, recipient lists for alarms, rates, and relationships between BMS data and other configuration data may be requested in accordance with the flowchart of FIG. 12. In operation 1202, the client-side Object Model passes the request to a server.

In operation 1204 on the server-side, the server-side Object Model passes the requests to the Data Model. In operation 1206, the Data Model requests the polling frequency for point A from the database. In operation 1208, the Data Model returns the polling frequency for point A to the server-side Object Model. In operation 1210, the server-side Object Model passes the polling frequency for point A to the client-side Object Model. In operation 1212 on the client-side, the client-side Object Model receives the polling frequency for point A from the server-side Object Model and passes it to the client application.

Figure 13A:
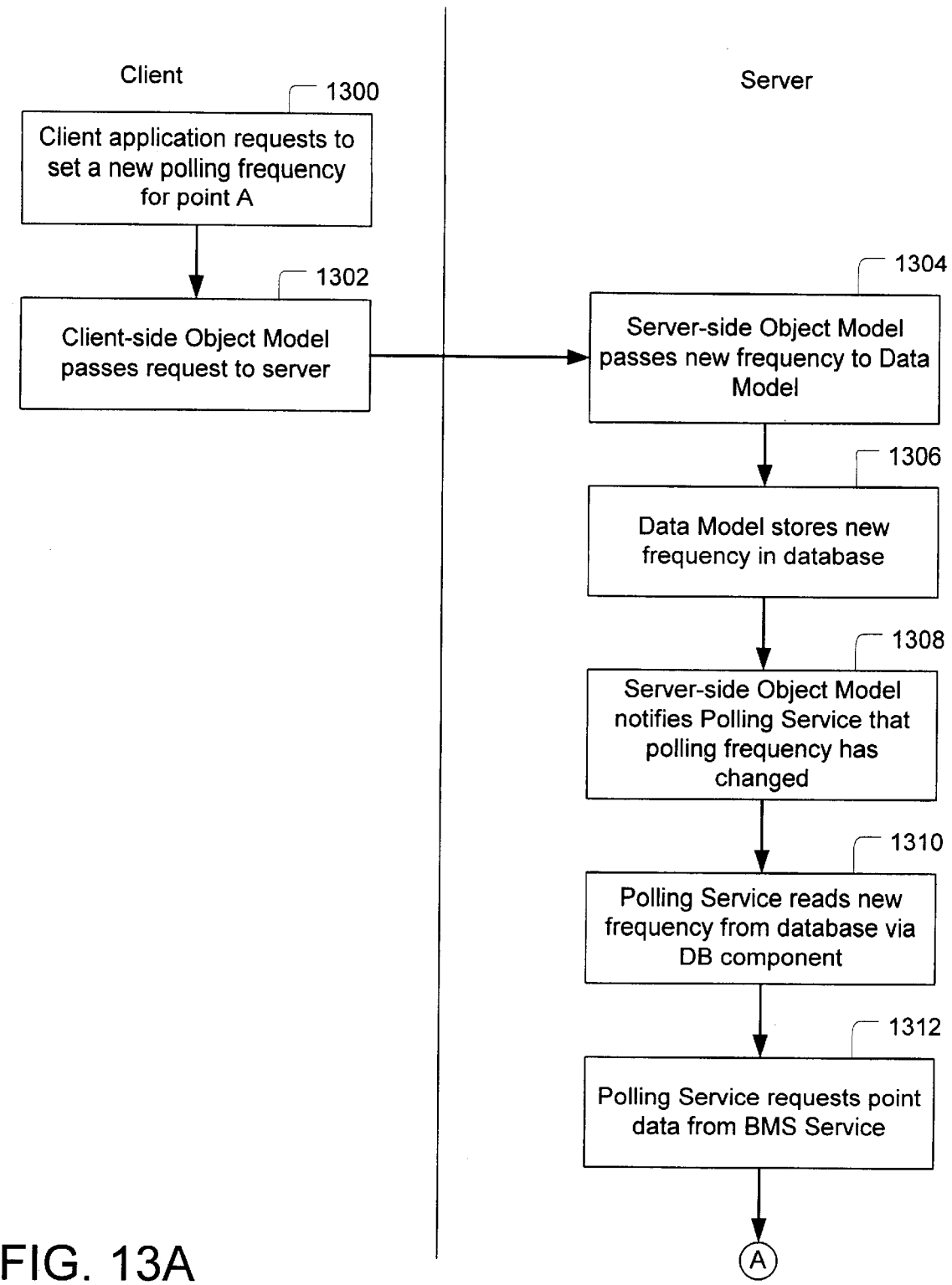
FIGS. 13A and 13B depict a flowchart of communications relating to setting a new polling frequency for a point in an embodiment of the present invention.
Figure 13B:
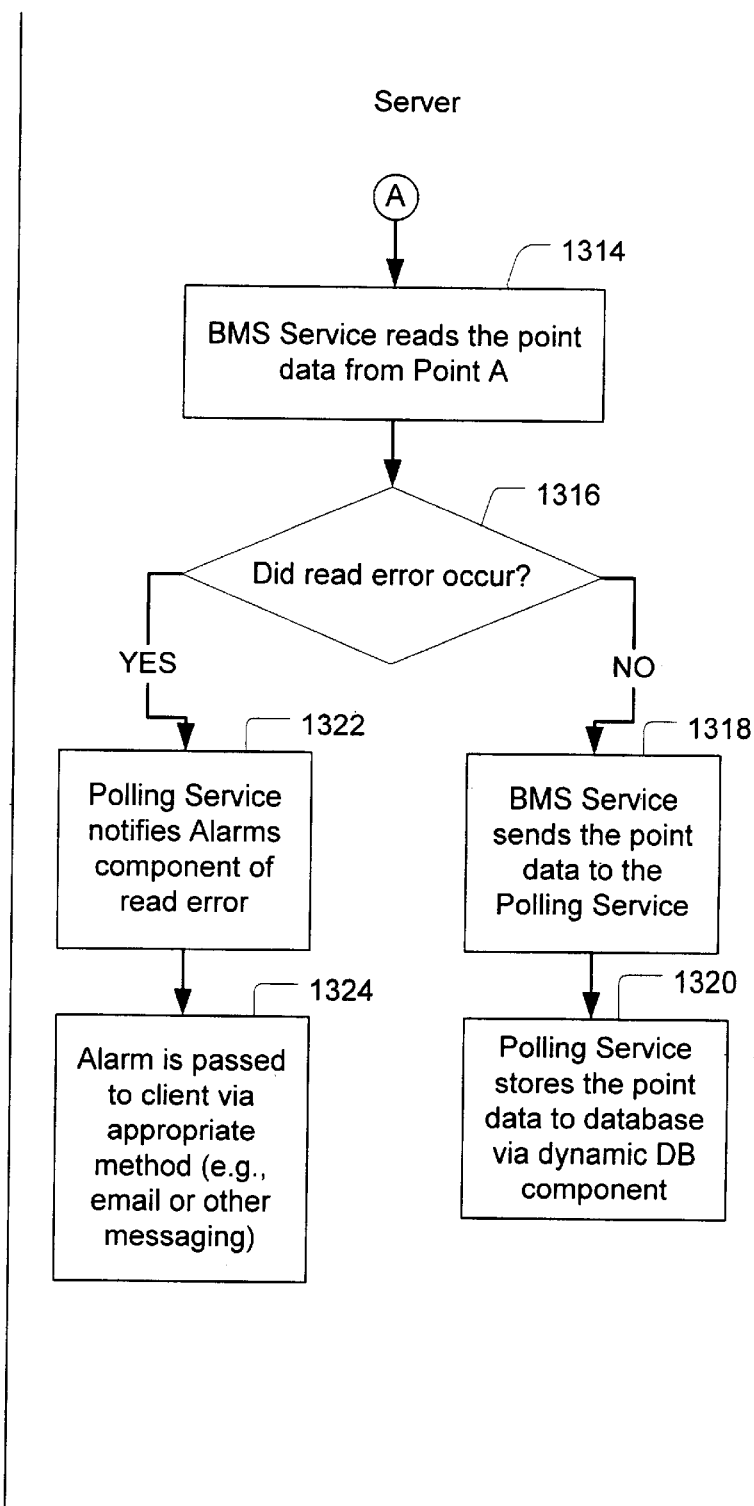

FIGS. 13A and 13B depict the communications relating to setting a new polling frequency for a point in an embodiment of the present invention. In operation 1300, the client application requests to set a new polling frequency for point A. In operation 1302, the client-side Object Model passes the request to the server.

In operation 1304 on the server-side, the server-side Object Model passes the new frequency, which was passed as a parameter in the request, to the Data Model. In operation 1306, the Data Model stores a new frequency in the database. In operation 1308, the server-side Object Model notifies the polling service that a polling frequency has changed. In an embodiment of the present invention, operations 1304 and 1308 are performed concurrently. In operation 1310, the polling service reads the new frequency from the database via the DB component, which preferably comprises the server-side Object Model and the Data Model. In operation 1312, the polling service requests point data from the BMS service in accordance with the new polling frequency.

In operation 1314, the BMS service reads the point data from point A. Operation 1316 determines whether a read error occurred. If a read error did not occur in operation 1318, the BMS service sends the point data to the polling service. In operation 1320, the polling service stores the point data to the database via the dynamic DB component. If a read error was detected in operation 1316, processing proceeds to operation 1322, where the polling service notifies an alarm component of the read error. In operation 1324, an alarm is passed to a client by an appropriate method (e.g., an e-mail or other messaging method) using configuration data from the database to identify recipients and describe the failure.

Figure 14A:
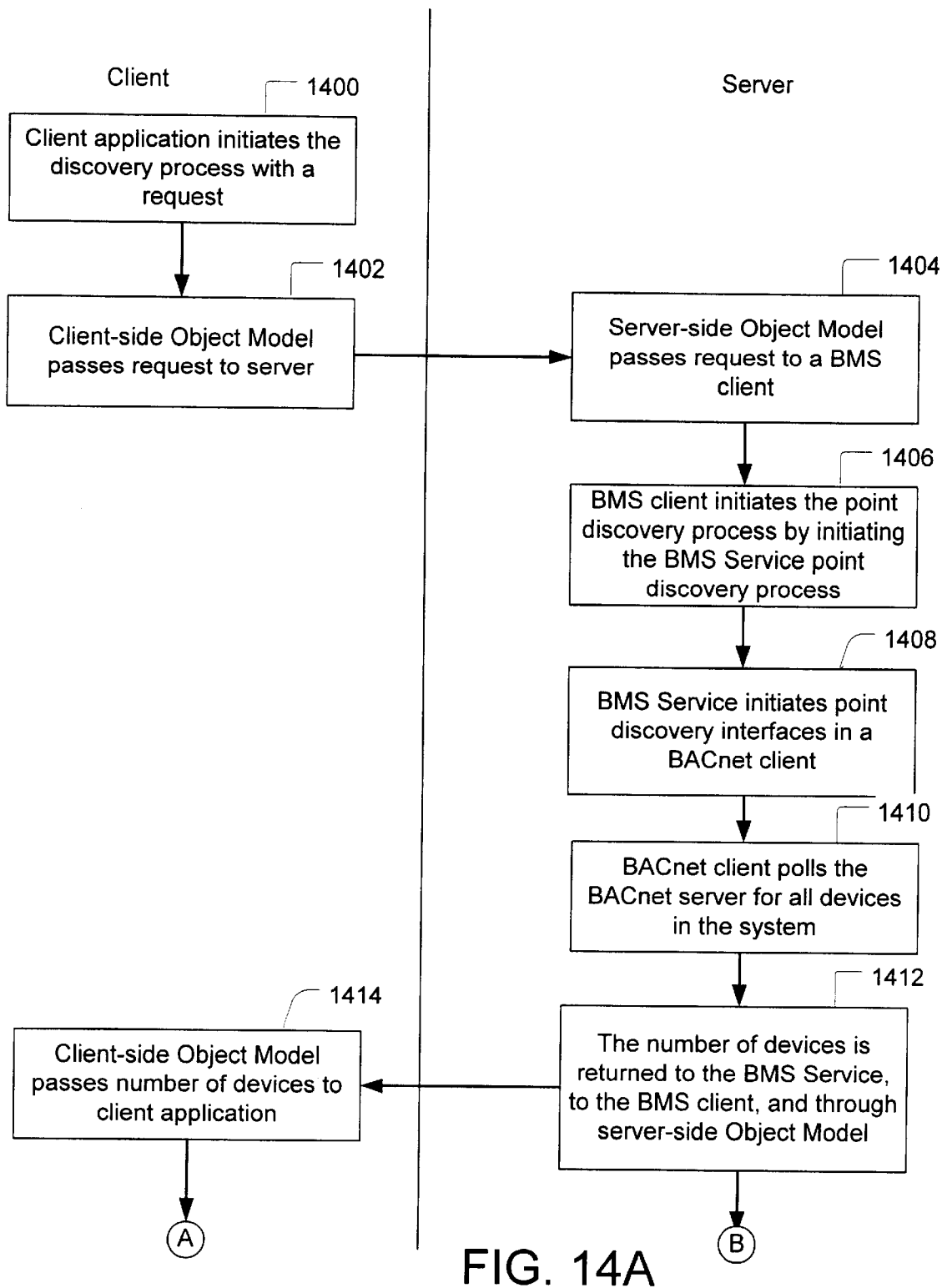
FIGS. 14A, 14B and 14C depict a flowchart of communications relating to the discovery of points coupled to the client/server system in an embodiment of the present invention.
Figure 14B:
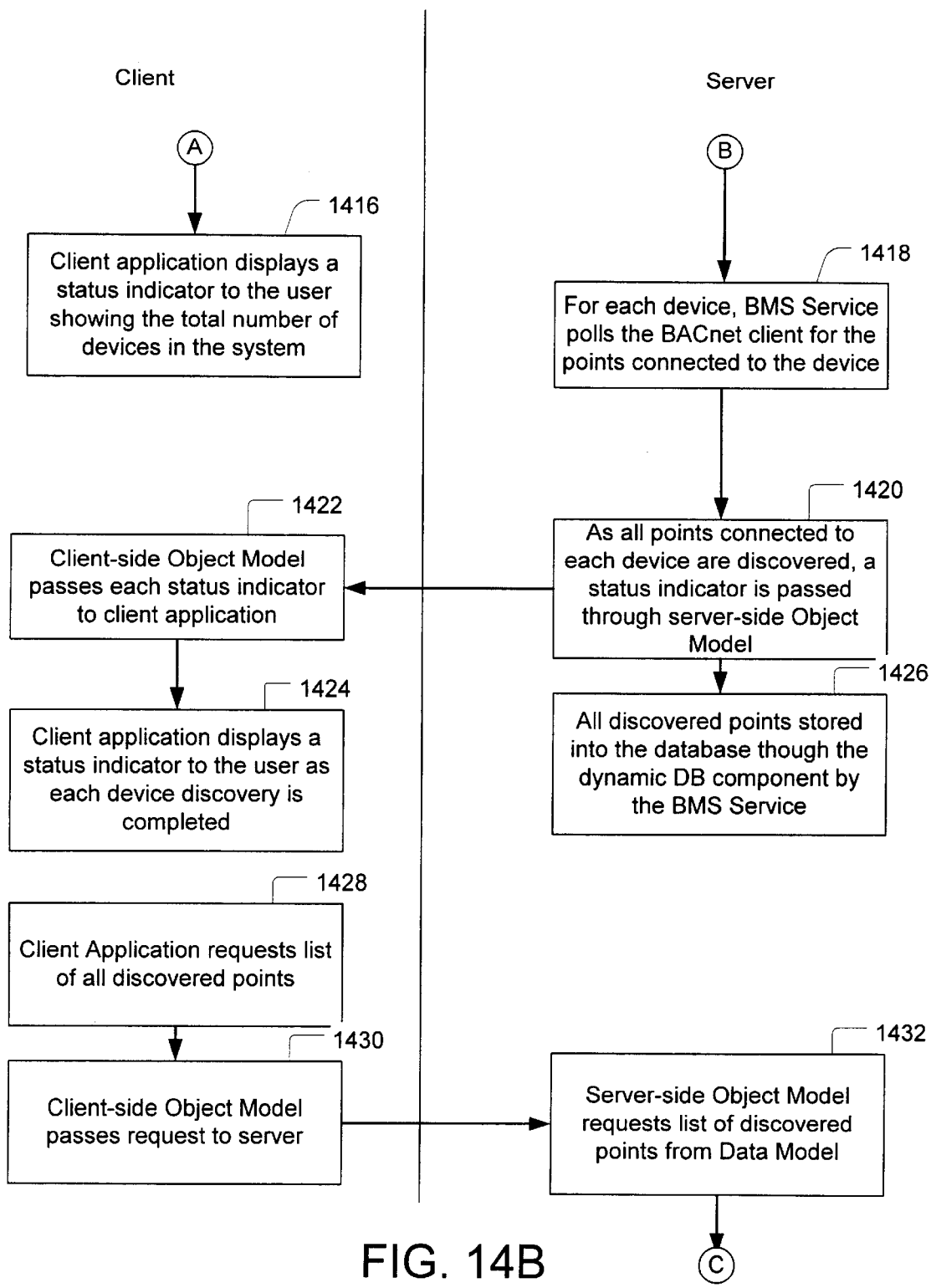
Figure 14C:
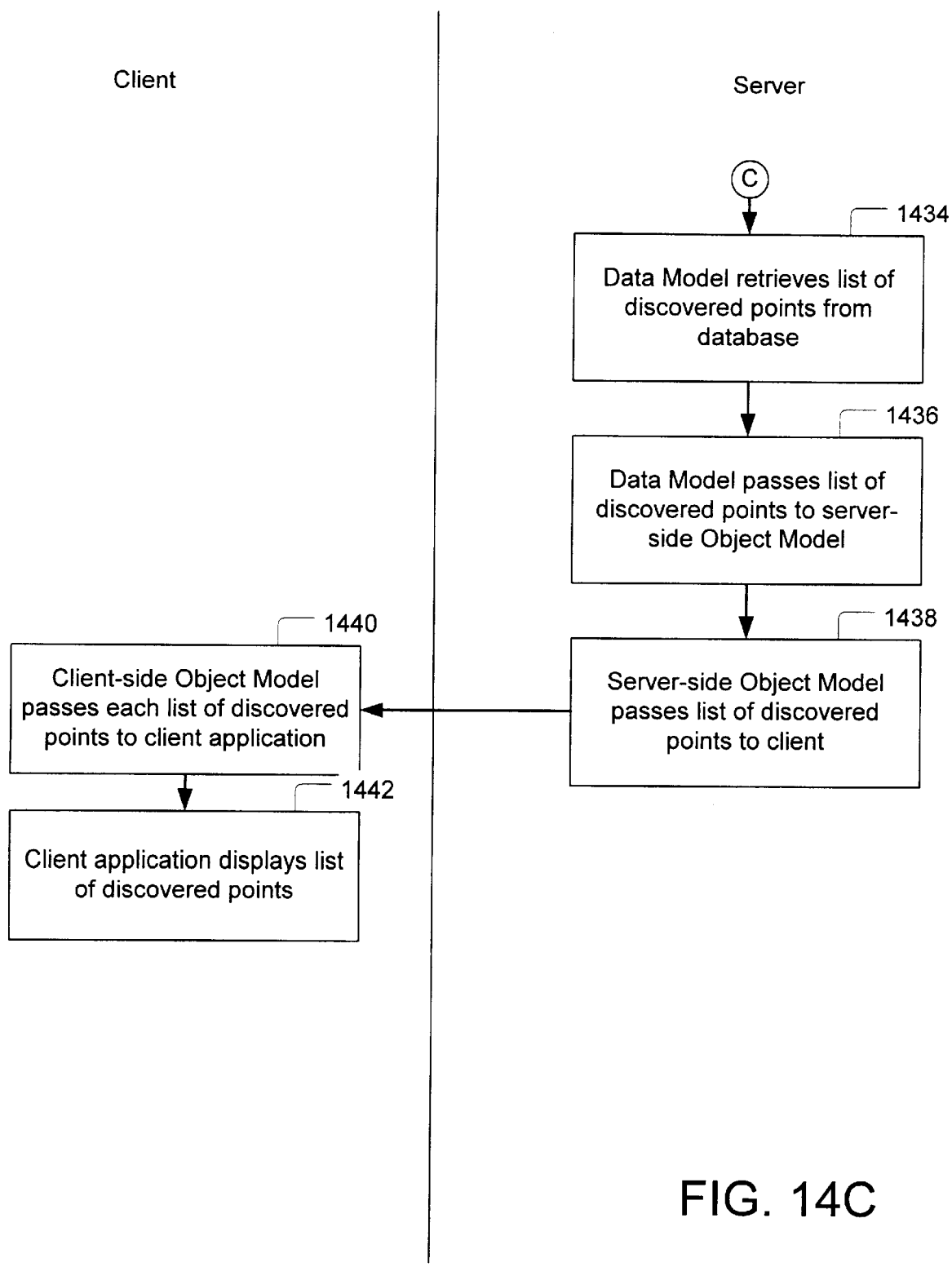

FIGS. 14A, 14B and 14C depict a flowchart of communications relating to the discovery of points coupled to the client/server system in an embodiment of the present invention. In operation 1400, the client application initiates the discovery process for the request. In operation 1402, the client-side Object Model receives the request and passes it to the server. In operation 1404 on the server-side, the server-side Object Model receives the request and passes it to a BMS client component of the BMS service. In operation 1406, the BMS client component initiates the BMS service point discovery process. In operation 1408, the BMS service initiates the point discovery interfaces in a BACnet client component. In operation 1410, the BACnet client component polls the BACnet server for all devices in the system. In operation 1412, the number of devices detected by the BACnet server is returned to the BMS service, to the BMS client, and through the server-side Object Model to the client-side Object Model. In operation 1414, the client-side Object Model receives the number of devices and passes it to the client application. In operation 1416, the client application displays a status indicator to the user showing the total number of devices in the system.

In operation 1418, the BMS service polls the BACnet client for the points connected to each device in the system. In operation 1420, as all points connected to each device are discovered, a status indicator is passed through the server-side Object Model to the client indicating that point discovery from that device is completed. In operation 1422 on the client-side, the client-side Object Model receives the status indicator and passes it to the client application. In operation 1424, the client application displays a status indicator to the user as each device discovery is completed. In operation 1426, all discovered points are stored into the database through the dynamic DB component by the BMS service.

In operation 1428, the client application requests a list of all discovered points. In operation 1430, the client-side Object Model receives the request and passes it to the server. In operation 1432 on the server-side, the server-side Object Model requests a list of discovered points from the Data Model. In operation 1434, the Data Model retrieves the list of discovered points from the database. In operation 1436, the Data Model passes the list of discovered points to the server-side Object Model. In operation 1438, the server-side Object Model passes the list of discovered points to the client. In operation 1440, the client-side Object Model receives the list of discovered points and passes it to the client application. In operation 1442, the client application displays the list of discovered points to a user.

In another embodiment of the present invention, the point discovery process is combined with a point mismatch alarm component that compares a first array of discovered points determined at a previous time with a second array of discovered points determined at a current time. The first array is preferably stored in the database and accessed by the point mismatch alarm component for comparison with the second array. If the arrays do not match, then the alarm component notifies an appropriate person (such a building operator) or service that a point mismatch is detected in accordance with a recipients list in the database. If the mismatch involves a point that is indicated in the first array but not the second array, the alarm indicates that a point is no longer responding to the discovery request, which may result from a malfunction of the corresponding equipment, a fault in the BMS network, and other events within the system. Alternatively if the mismatch involves a point that is indicated in the second array but not the first array, the alarm indicates that a new point has been discovered. For example, the "new point" alarm may notify a person or service to map the new point using the schematic mapping capability of an embodiment of the present invention.

Figure 15:
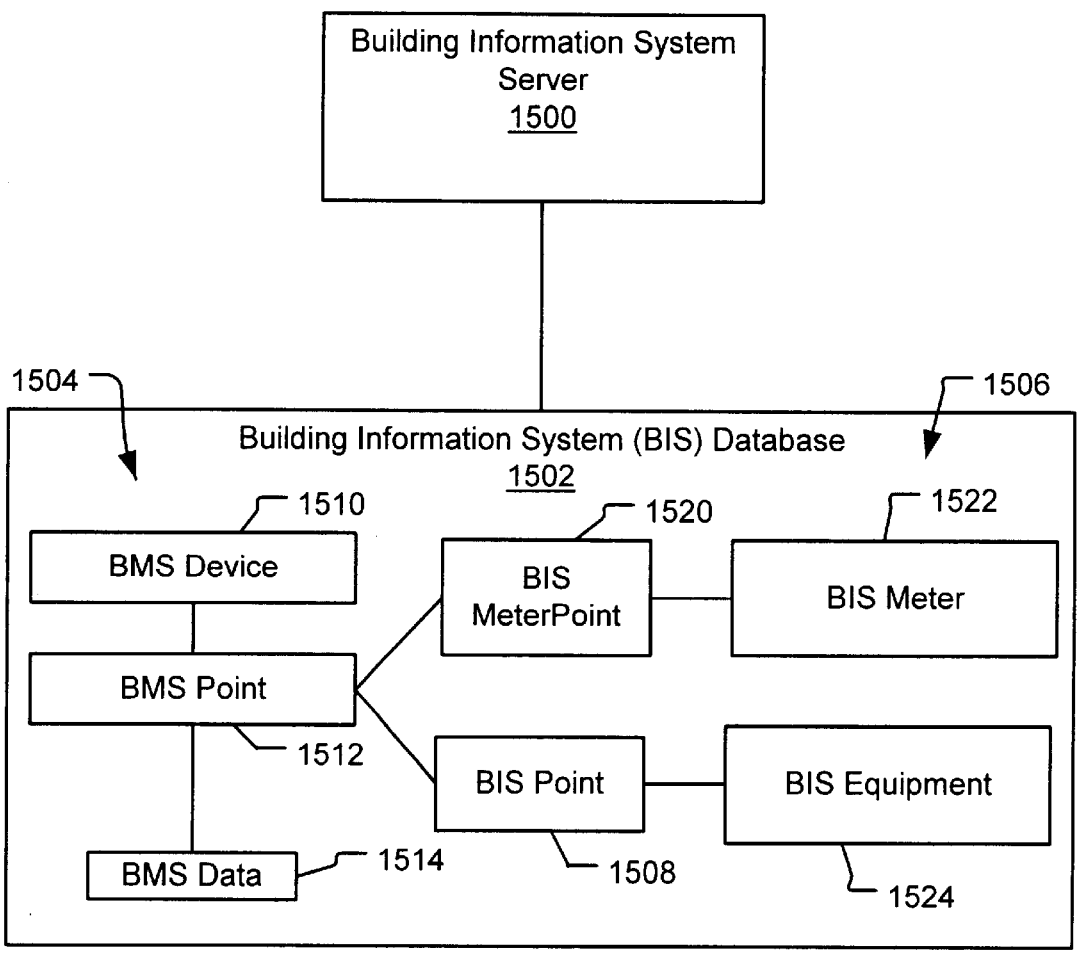
FIG. 15 illustrates data structures and relationships in an exemplary Building Information System (BIS) database in an embodiment of the present invention.

FIG. 15 illustrates data structures and relationships in an exemplary Building Information System (BIS) database in an embodiment of the present invention. A BIS server 1500 preferably comprises the processing elements of a server computer system, such as the server 600 of FIG. 6A. Such elements, for example, may include a client interface 620, one or more service applications 618, a data interface 616, a BMS service 614, and one or more network interfaces. Other server configurations for managing building information systems are also contemplated within the scope of the present invention.

In the illustrated embodiment, the BIS server 1500 is coupled via a communications network or data bus to access one or more storage media including a BIS database 1502. Database tables in the BIS database 1502 (such as 1504, 1506, 1520 and 1508) define various COM-based objects. Generally, database tables consist of rows corresponding to a given object (identified by a unique ID) and its attributes. Alternative data formats (e.g., XML or other text-based formats) or structures may also be employed in place of or in combination with the database tables within the scope of the present invention.

In the illustrated embodiment, individual BMSPoint objects (defined in a BMSPoint table 1502) are associated with one or more BIS equipment objects (defined in BISEquipment table 1506) by a mapping structure, such as a BISPoint table 1508 or a BISMeterPoint table 1520. In various embodiments of the present invention, the BISEquipment table 1506 generically represents a variety of specific building-related database tables within a given building information system, including without limitation tables for specific equipment (e.g., boilers, chillers, cooling towers); tables for specific buildings; tables for associated utilities, owners and tenants; tables for building system loops; and tables for utility rates.

The BNIS objects preferably represent physical points, meters and devices within a BMS network. For example, dynamic BMS data 1514 (e.g., represented by objects defined in the input and output tables discussed with regard to FIGS. 22–24) is generated or received by one or more associated BMS points within the BMS network. In an embodiment the present invention, BMSPoint objects are contained by BMSDevice objects (defined in BMSDevice table 1510), wherein each BMSDevice object is associated with one or more BMSPoint objects and related BMS data. Accordingly, in this architecture, multiple sensors, actuators, and meters can be associated with a single BMS device.

Database tables 1506 in the BIS database 1502 define configuration elements (i.e., configuration database components) associated with the building information system in the database. The configuration elements are represented as BIS objects, which are partially defined by a base class (e.g., "BIS Component") from which all BIS objects are derived. The associated base class describes the basic attributes preferably common to all BIS objects in the BIS database 1502. The structure of an exemplary BIS Component class is illustrated in Table 1. Each BIS object derived from a BIS Component includes the fields of the BIS Component as well as other fields specific to the individual BIS objects.

TABLE 1

| Field Name | Description |
| --- | --- |
| ComponentId | The Primary key for the BIS component |
| ContainerKey | A Foreign key to a Container object |
| CampusKey | The ComponentKey of the Campus object |
| BuildingKey | The ComponentKey of the Building object |
| Name | The name of the Component object |
| Description | The description of the Component object. The default value is " ". |
| Type | The type of the Component object |
| Status | Active or inactive |

Generally, configuration database components storing configuration information associated with a building are structured as BIS Components. BMS database components relating to BMS data associated with a point in a building on the BMS network are mapped to BIS Component objects via the BISPoint table 1508, which establishes a database relationship between a BMSPoint object 1512 (and the associated BMS data) and a BIS Component 1524 (e.g., a cooling tower object). In addition, BMS database components associated with BMS data associated with a meter in a building on the BMS network are mapped to BIS Component objects via the BISMeterPoint table 1520, which establishes a database relationship between the BMSPoint object 1512 (and the associated BMS data) and the BIS Component 1522 (e.g., a BISMeter object).

Figure 16:
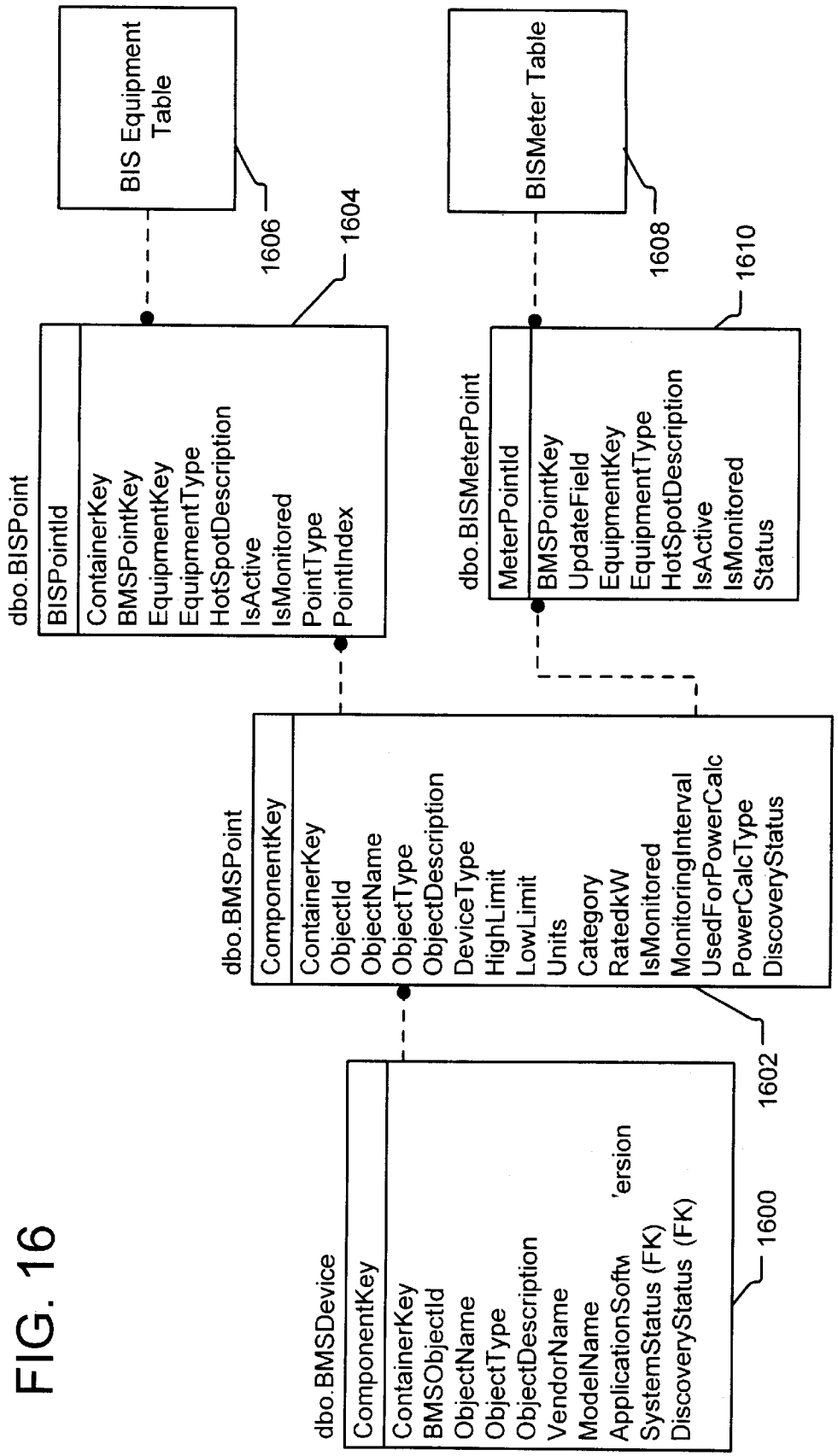
FIG. 16 illustrates mapping structures used to establish data relationships between building management system database components and building information system configuration components in an embodiment of the present invention.

FIG. 16 illustrates mapping structures used to establish data relationships between building management system database components and building information system configuration components in an embodiment of the present invention. The "dbo" label identifies the data structures as a "database object". It is to be understood that the database tables disclosed herein are exemplary tables with exemplary structures employed in one embodiment of the present invention. Alternative or additional tables with alternative structural configurations may also be employed within the scope of the present invention. Furthermore, in FIGS. 16–24, the lines connecting the various database table representations indicate a one-to-many database relationship between the connected tables (i.e., the "many" characteristic is indicated by the dot at one end of the connector). For example, the connector between the BMSDevice table 1600 and the BMSPoint table 1602 indicates that "many" BMSPoint objects may be referenced (e.g., contained by) by a single BMSDevice object.

A BMSDevice table 1600 preferably defines BMS device objects (e.g., representing equipment on the BMS network). In one embodiment, a BMSDevice object 1600 is contained by an Owner object (see FIG. 17), which is a BIS Component describing an owner of a building coupled to the building information system, including contact information used for alarms and other communications. The "ComponentKey" field contains a primary or foreign key for a given BMSDevice object. The "BMSObjectID" field contains a unique numeric ID code associated with the BMS device on the BMS network (i.e., unique within a given Owner object). In one embodiment, the BMSObjectID code is unique within the entire BIS, even if the equipment is owned by different owners. In an alternative embodiment, additional gateway information is included in association with each BMSObjectID code, so that the code is merely unique within a given BMS network. The "ObjectType" field indicates a membership to a particular enumerated object type class. Exemplary object types are defined by the BACnet standard, maintained by the American Society of Heating, Refrigerating, and Air-Conditioning Engineers ("ASHRAE"), although additional types may also be employed in alternative embodiments. The "ObjectDescription" field contains a character string description of a given BMS device. The "VendorName" field contains a character string description of the manufacturer of the BMS device. The "ModelName" field contains a character string description of the model of the BMS device. The "ApplicationSoftwareVersion" field includes a character string description of the version of the application software installed on the BMS device. The "SystemStatus" field contains an enumerated system status indicator associated with the BMS device, such as OPERATIONAL, READ_ONLY, DOWNLOAD_REQ, etc. The "DiscoveryStatus" field contains an enumerated discovery status indicator, such as "Deleted", "Discovery Not Complete", "Discovery Complete", etc.

A BMSPoint table 1602 defines BMS point objects corresponding to sensors and actuators on equipment in the BMS network. In one embodiment of the present invention, configuration information (e.g., in BISMeter component 1522 and BISEquipment component 1524) is mapped through mapping structures (e.g., BISMeterPoint table 1520 and BISPoint table 1508) to a BMSPoint object 1602, which is associated with dynamic data that is input from and output to the BMS network. In an alternative embodiment, a BMSMeter object (not shown) may be used as a separate BMS counterpart mapped to the BISMeter component 1522. In the alternative embodiment, the BMSMeter object is associated with the dynamic input and output data of meters on the BMS network.

A BMSPoint object includes one or more BMS attribute fields characterizing the BMS Point object. Furthermore, a BMSPoint object 1602 is preferably contained by a BMSDevice object. The "ComponentKey" field contains a primary or foreign key for a given BMSPoint object. The "ContainerKey" field contains a foreign key to the containing BMSDevice object. The "ObjectId" field contains a unique numeric ID code associated with the BMS point (i.e., unique within the BMSDevice object). The "ObjectType" field indicates a membership to a particular enumerated object type class. The "ObjectDescription" field contains a character string description of the BMS point. In one embodiment, a standard 8-character BMS identifier populates the "ObjectDescription" field. In alternative embodiments, other descriptors or identifiers may be employed in the ObjectDescription field. The "DeviceType" field contains a text description of the physical sensor or actuator connected through an analog input.

The "HighLimit" field contains a floating point upper limit that the dynamic data associated with the current BMSPoint object 1602 must exceed to generate an alarm event. The "LowLimit" field contains a floating point lower limit that the dynamic data associated with the current BMSPoint object 1602 must fall below to generate an alarm event. The "Units" field contains an enumerated engineering unit of measure associated with the values of the current BMSPoint object 1602. The "Category" field contains the enumerated category associated with the unit of measure indicated in the Units field. The "RatedkW" field contains the power rating of the current point. The "IsMonitored" field contains a primary flag indicating whether the point is monitored. The "MonitoringInterval" field containing a time interval at which the current point is sampled. The "UsedForPowerCalc" field contains a binary flag that denotes whether the associated BMS data received from the point is used in a power calculation for the piece of equipment to which it is associated. The "PowerCalcType" field contains an enumerated indicator of the type of power calculation to perform using the associated BMS data, such as Power, Current, Status, None, etc. The "DiscoveryStatus" field contains an enumerated discovery status indicator, such as "Point Deleted", "Discovery Not Complete", "Discovery Complete", etc.

The BISPoint table 1604 defines a mapping structure to establish a database relationship between the dynamic BMS data associated with a BMSPoint object and a corresponding configuration data defined by a BIS Component. In an embodiment of the present invention, the dynamic BMS data is represented in the BMS data table 1504 in FIG. 15 and is associated with a BMSPoint object 1602. In addition, the BIS configuration data is preferably defined in a BIS Component table, such as BIS Equipment table 1606 or BIS Meter table 1608 (see the description of BISMeter table 1802 in FIG. 18). By following the database relationships established by the BISPoint table 1604, a BIS service operating on BMS data can identify the corresponding configuration data to provide enhanced capabilities. For example, The BISPoint table 1604, for example, maps BMSPoint objects to configuration information associated with one or more pieces of equipment or other BIS configuration components (such as buildings, campuses, utilities, loops, etc.). The "BISPointId" field contains a primary key for a given mapping structure (e.g., recorded in a row of the table). The "ContainerKey" field includes a foreign key to the containing BIS equipment object or a BIS loop object that is associated with a controlled point (i.e., an output) or a monitored point (i.e., an input). The "BMSPointKey" field contains a foreign key to a BMSPoint object that is mapped to the BIS Component object indicated in the "EquipmentKey" field, The "EquipmentKey" field includes a foreign key to a BIS equipment component object or a BIS loop component object that is associated with the controlled point or the monitored point. The "EquipmentType" field contains the enumerated type of the BIS Component object indicated in the EquipmentKey field.

The "HotSpotDescription" field contains a memory description for a hotspot diagram points type that is used to map a dynamic data stream to a piece of equipment. A hotspot represents a schematic location of a point or meter on a piece of equipment. The "IsActive" field contains a binary flag indicating a status of the associated BMS point (e.g., Active or Inactive). The "IsMonitored" field contains a binary flag indicating whether the point is being monitored (i.e., periodically read and stored in the database"). The "PointType" field contains a description of the type of hotspot point described by the current object, including without limitation BIS_SENSOR, BIS_SETPOINT, BIS_POWERSTATUS, and BIS_ARROW. The "PointIndex" field contains an index into the schematic for the hotspot, wherein the schematic preferably includes a graphical schematic control displayed on the client and a server-side object maintaining a list of hotspots on a given piece of equipment.

A BISMeterPoint table 1610 maps BMSPoint objects to configuration information relating to a meter or to a hotspot description. The "MeterPointId" field contains a primary key for a given BISMeterPoint object. The "BMSPointKey" field contains a foreign key of the BMSPoint object to which the meter is being mapped. The "UpdateField" field contains a character string name of the field to be updated. The "EquipmentKey" field contains a foreign key to a BIS equipment component or loop component object that is associated with either a controlled point (i.e., an output) or a monitored point (i.e., an input). A controller is an exemplary output, and a sensor is an exemplary input. The "EquipmentType" field contains the enumerated type of the BIS Component object indicated in the EquipmentKey field. The "HotSpotDescription" field contains a memory description for a hotspot diagram point type that is used to map a dynamic data stream to a piece of equipment. The "IsActive" field contains a binary flag indicating a status of the associated BMS point (e.g., Active or Inactive). The "IsMonitored" field contains a binary flag indicating whether the point is being monitored (i.e., periodically read and stored in the database". The "Status" field indicates an enumerated status value, preferably including one of the following: "Point Deleted", "Discovery Not Complete", or "Discovery Complete".

Although the objects 1600 and 1602 include information in BMS attribute fields (e.g., HighLimit and Units), the BMS objects 1600 and 1602 are also mapped to configuration components (e.g., BIS Components) in the database via the BISPoint object 1604 and BISMeterPoint object 1610, which function as mapping structures. Each BMSPoint object 1602 is preferably associated with dynamic data (e.g., stored in the objects described with regard to FIG. 22–24)) received from or destined to BMS equipment on the BMS network. Server application can coordinate the dynamic data relative to configuration information for a facility, a facility owner, a building, a building campus, an associated utility, and internal building systems (e.g., HVAC ("heating, ventilation and air-conditioning") or electrical systems) based solely on the configuration information (e.g., independent of a given BMS Point's 8-character identifier).

For example, an application, such as an alarm application, can monitor dynamic data from a sensor on a given piece of equipment, based on the equipment's real-world description and the sensor's hotspot description (examples of configuration information), rather than based on the BMS identifier for the sensor. The BIS maps these real-world descriptions through the mapping structure to identify the corresponding BMS point on the BMS network. Dynamic data associated with the BMS point can then be accessed and analyzed by the application. If an alarm limit is exceeded, the application can issue an alarm message to an owner or other specified contact person associated with the piece of equipment via e-mail, pager, telephone, or other communication method based on configuration information stored in the database.

Figure 17:
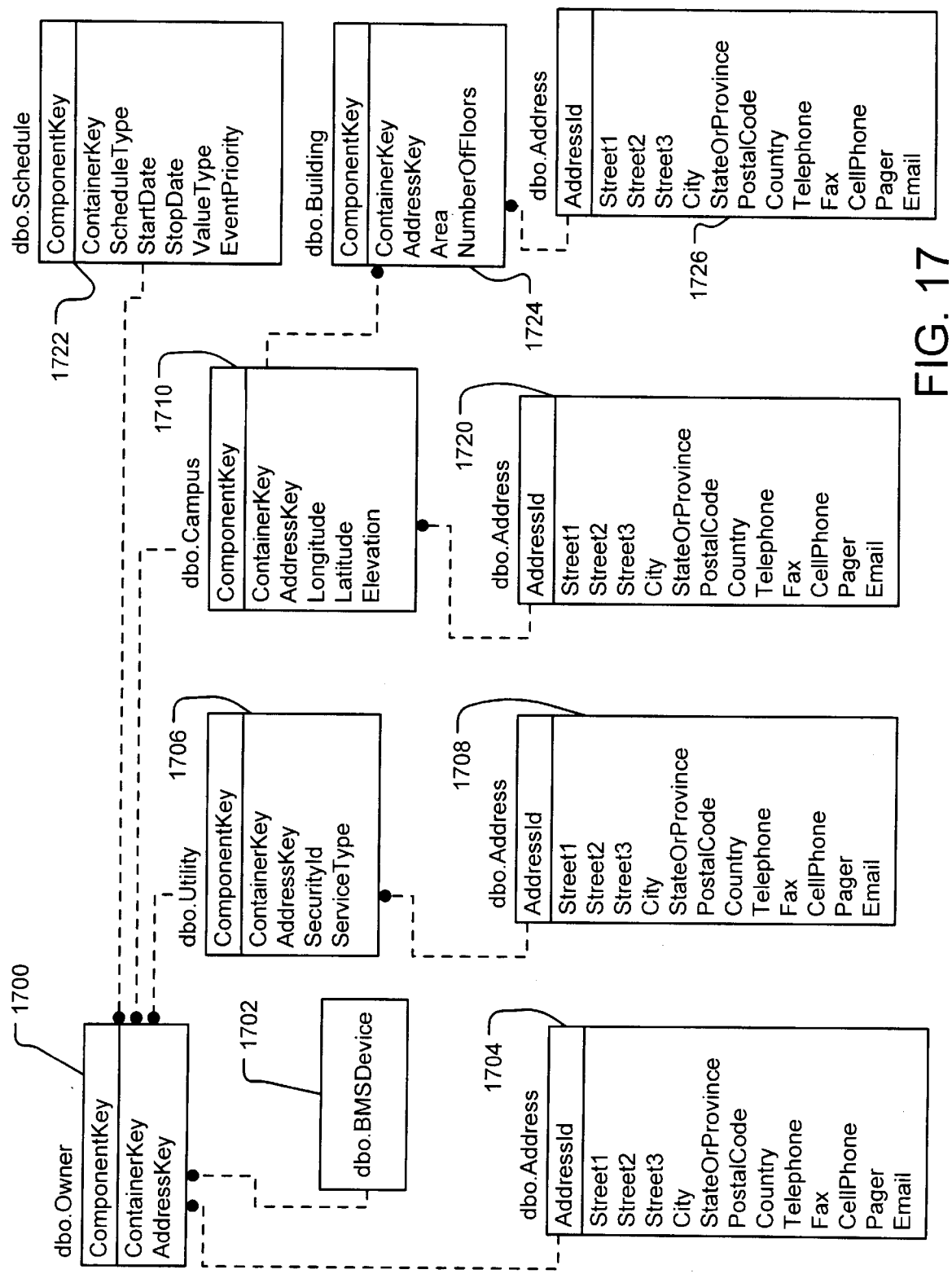
FIG. 17 illustrates exemplary database tables and corresponding relationships relating to "Owner" objects in Owner table 1700 in an embodiment of the present invention.

FIG. 17 illustrates exemplary database tables and corresponding relationships relating to "Owner" objects in Owner table 1700 in an embodiment of the present invention. The Owner object 1700 contains references to configuration information about a building owner. In an embodiment of the present invention, the Owner object 1700 is the highest BIS Component in the BIS object hierarchy, although other BIS object hierarchies are contemplated within the scope of the present invention. The "ComponentKey" field contains a primary or foreign key for a given Owner object. The "ContainerKey" field contains a foreign key to a container object. In an embodiment the present invention, the Owner object has no container object, which is indicated by a "−1" value in this field. In an alternative embodiment, however, the Owner object may be contained by another object. The "AddressKey" field contains a foreign key to an Address object (defined in Address table 1704), which contains contact information associated with the owner.

The Utility table 1706 defines BIS Component objects that store configuration information about utilities, and their representative and rates. The "ComponentKey" field contains a primary or foreign key for a given Utility object. The "ContainerKey" field contains a foreign key to the containing Owner object. The "AddressKey" field contains a foreign key to an Address object (defined in Address table 1708), which contains contact information associated with a given utility. The "SecurityId" field is a Windows NT Security ID (SID) used to gain access to the Utility object. The "ServiceType" field contains enumerated service type (e.g., natural gas, electric, etc.) supplied by the utility. Preferably, a Utility object 1706 is also associated with a rate schedule table (not shown) and a rate contract table (not shown) used to define the configuration of rates provided by a corresponding utility and relating to the type of service provided by the utility.

One or more Campus objects 1710 are contained by a given Owner object 1700 in an embodiment the present invention. A Campus object (defined by Campus table 1710) is a BIS Component that stores configuration information about a building campus including one or more buildings. The "ComponentKey" field contains a primary or foreign key for a given Campus object. The "ContainerKey" field contains a foreign key to a containing Owner object. The "AddressKey" field contains a foreign key to the Address object (defined in Address table 1720), representing the address of the campus defined in Campus object 1710. The "Longitude" field contains a longitude value corresponding to the current campus. The "Latitude" field contains a latitude value corresponding to the current campus. The "Elevation" field contains an elevation value corresponding to the current campus.

One or more Building objects 1724 are contained by a given Campus object 1710 and store configuration information relating to buildings coupled by a given BMS network. A Building object (defined by Building table 1724) is a BIS Component that stores configuration information about a building coupled with the BMS network. The "ComponentKey" field contains a primary or foreign key to a given Building object. The "ContainerKey" field contains a foreign key to be containing Campus object. The "AddressKey" field contains a foreign key to an Address object (defined in Address table 1726), which contains contact information associated with the building. The "Area" field contains a floating point value defining the total floor area of the building. The "NumberOfFloors" field describes a number of floors in the building.

The Schedule object (defined by the Schedule table) 1722 is a BIS Component object that stores configuration information about a complete schedule suitable for defining occupancy or equipment schedules. Preferably, the Schedule object 1722 is substantially compatible with schedules provided by common building management systems. If the type of schedule is "Equipment", then a group of BMS points is associated with the schedule. If the type of schedule is "Occupancy", then a building zone is associated with the schedule. The "ComponentKey" field contains a primary or foreign key of a given Schedule object. The "ContainerKey" field contains a foreign key to the containing Owner object 1700. The "ScheduleType" field contains an enumerated value indicating whether the schedule is an occupancy schedule, an equipment schedule, or other type of schedule. An occupancy schedule indicates the historical occupancy of a given building. In addition, some equipment in a building is not actively controlled, but is run entirely on a fixed schedule. For example, the lighting in a parking lot or a company sign may be on a fixed seasonally adjusted equipment schedule. The "StartDate" field defines the starting date for the schedule. The "StopDate" field defines the stopping date for the schedule. A given schedule is valid only between its starting date and its stopping date. The "ValueType" indicates whether the value of the object contained by the Schedule object 1722 indicates an absolute value or a percentage value.

Figure 18:
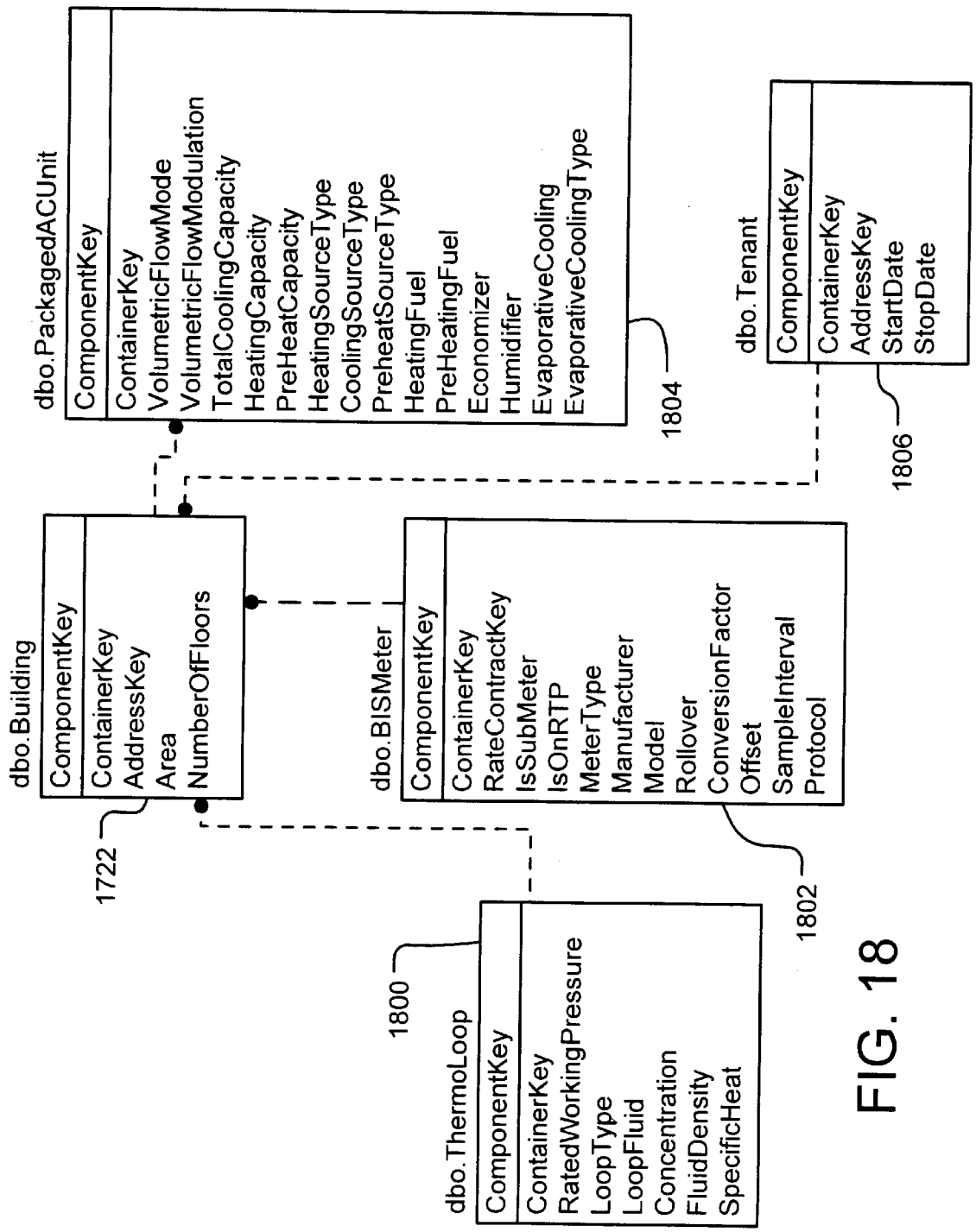
FIG. 18 illustrates exemplary database tables associated with a Building table in an embodiment the present invention.

FIG. 18 illustrates exemplary database tables associated with the Building table 1722 in an embodiment the present invention. In alternative embodiments, one or more of the database tables discussed in FIGS. 18–20 may be associated with the Building table 1722. Furthermore, alternative or additional database tables (not shown) may be employed in association with the Building table 1722. A ThermoLoop object (defined in ThermoLoop table 1800) is a BIS Component that stores configuration information about a fluid conducting loop that is associated with various pieces of equipment, such as boilers, chillers, steam to hot water converters, heat recovery chillers, central heat pumps, cooling towers, generic heat sources, and generic cooling sources. The "ComponentKey" field contains a primary or foreign key for a given ThermoLoop object. The "ContainerKey" field contains a foreign key to the containing Building or Campus object. The "RatedWorkingPressure" field contains an integer value representing the working pressure of the fluid loop. The "LoopType" field indicates the type of thermal loop, such as a steam loop, a hot water loop, a chilled water loop, a changeover loop, a heat pump loop, a heat rejection loop, and other generic thermal loops. The "LoopFluid" field contains an enumerated indicator of the type of fluid, include without limitation pure water, saltwater, ethylene glycol, and propylene glycol.

Most medium to large buildings provide heating and cooling in a building by pumping fluid in pipes from a boiler or a chiller to an air handling unit. To analyze the heat distribution performance of the heating/cooling system, an application may require the heat transfer characteristics of the fluid in the pipe, which may be accessed or derived from one or more of the following three fields. The "Concentration" field contains a concentration value (e.g., 10%) associated with the fluid in the loop. The "FluidDensity" field contains the fluid density parameter of the fluid in the loop. The "SpecificHeat" field contains the specific heat parameter for the fluid in the loop. While the information in the preceding three fields may be considered redundant, it is not uncommon for a building operator to know only the concentration of ethylene glycol, for example, in their loop. In this situation, an application can calculate the fluid density in the specific heat parameters of a fluid in the pipes from the fluid type and the concentration provided.

A BISMeter object (defined in BISMeter table 1802) is a BIS Component that stores configuration information about a meter device on the BMS network that measures and periodically reports use and demand information. Each meter preferably has a reporting interval associated with it to specify the approximate amount of time between readings for inclusion in the database. The "ComponentKey" field contains a primary or foreign key for a given BISMeter object. The "ContainerKey" field contains a foreign key to a containing Building or BISMeter object (i.e., a meter object can be contained by another meter object). The "RatesContractKey" field contains a foreign key to an object in a rate contract table (not shown), which specifies configuration information relating to a utility contract, such as a foreign key to an associated utility, a foreign key to a rate schedule, a foreign key to a customer (e.g. an Owner or Tenant), an account number, and high and low limits for rate alarms. The "IsSubMeter" field is a primary flag indicating whether the meter is a submeter (i.e., a meter contained in another meter). The "IsOnRTP" field is a primary flag indicating whether the meter is used in real-time pricing control. The "MeterType" field is an enumerated value indicating the type of meter (e.g., electric, gas or water).

The "Manufacturer" field contains a character string describing the manufacturer of the meter. The "Model" field contains a character string describing the model of the meter (e.g., Phase3). The "Rollover" field contains a value at which the meter "wraps" to zero (e.g., "1999" wraps to "2000"). The "ConversionFactor" field contains a linear floating point conversion factor based on ax+b, where "x" is the meter reading in pulses and "a" is the conversion factor. The "Offset" field contains a floating point constant based on ax+b, where "x" is the meter reading in pulses and "b" is the constant. The "SampleInterval" field contains a value indicating the frequency at which a meter reading is reported to the database. The "Protocol" field indicates a meter protocol, such as CEBus, EnFlex, etc.

A PackagedACUnit object (defined in PackagedACUnit table 1804) is a BIS Component that stores configuration information about equipment in the BMS network that uses an integrated refrigeration cycle for cooling the fluid. The "ComponentKey" field contains a primary or foreign key for a given PackagedACUnit object. The "ContainerKey" field contains a foreign key to the containing Building object. The "VolumetricFlowMode" field indicates the type of flow through the unit, such CAV ("Constant Air Volume") and VAV ("Variable Air Volume"). The "VolumetricFlowModulation" field indicates the type of flow modulation used in the PackagedACUnit, such as VANES/DAMPER or VFD ("Variable Frequency Drive").

The "TotalCoolingCapacity" field indicates the total cooling capacity of the air conditioning ("AC") unit. The "HeatingCapacity" field indicates the heating capacity of the AC unit. The "PreHeatCapacity" field indicates the pre-heating capacity of the AC unit. The "HeatingSourceType" field indicates the type of heating source used in the PackagedACUnit, such as INTERNAL or NONE. The "CoolingSourceType" field indicates the type of cooling source used in the PackagedACUnit, such as INTERNAL or NONE. The "PreheatSourceType" field indicates the type of freedom heating source used in the PackagedACUnit, such as INTERNAL or NONE. The "HeatingFuel" field indicates the type of fuel used by heating equipment in the PackagedACUnit. The "PreheatFuel" field indicates the type of fuel used by preheating equipment in the PackagedACUnit. The "Economizer" field is a binary flag indicating whether the unit includes an economizer. The "Humidifier" field is a binary flag indicating whether the unit includes a humidifier. The "EvaporativeCooling" field is a binary flag indicating whether the unit supports evaporative cooling capability. The "EvaporativeCoolingType" field indicates the type of evaporative cooling used in the PackagedACUnit, such as DIRECT or INDIRECT.

A Tenant object (defined in Tenant table 1806) is a BIS Component that contains configuration information for a building occupant associated with at least one zone. For example, a tenant may occupy all or part of a building in which the occupied space is associated with a HVAC zone. The "ComponentKey" field contains a primary or foreign key for a given Tenant object. The "ContainerKey" field contains a foreign key to a containing Building object. The "AddressKey" contains a foreign key to an Address object (not shown). The "StartDate" field indicates starting occupancy date for the tenant. The "StopDate" field indicates the ending occupancy date for the tenant.

Figure 19:
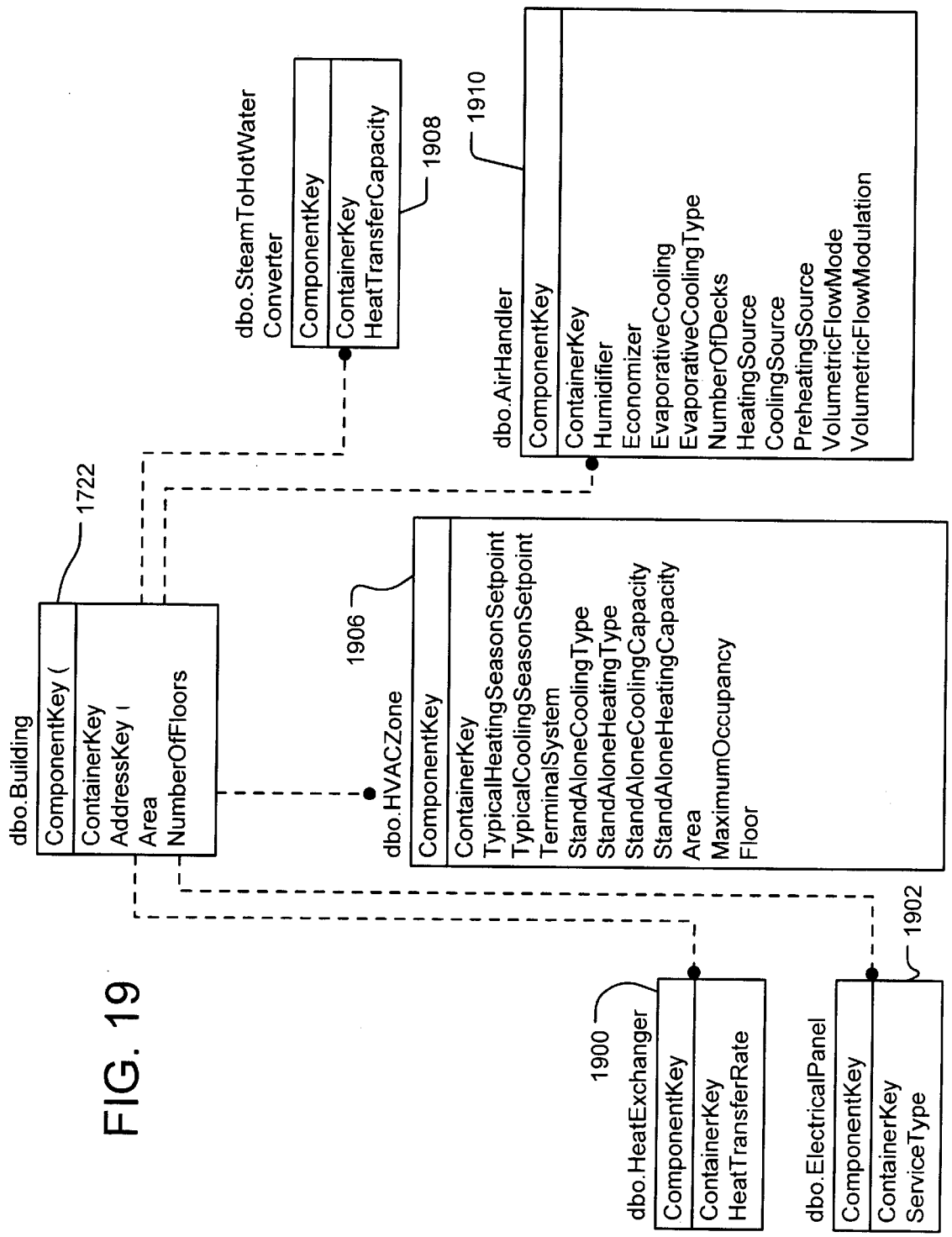
FIG. 19 illustrates additional exemplary database tables associated with a Building table in an embodiment of the present invention.

FIG. 19 illustrates additional exemplary database tables associated with a Building table in an embodiment of the present invention. A HeatExchanger object (defined in HeatExchanger table 1900) is a BIS Component that stores configuration information for heat transfer equipment in the BMS network, which is used to provide heat transfer between the non-mixing media. The "ComponentKey" field contains a primary or foreign key for a given HeatExchanger object. The "ContainerKey" field contains a foreign key to a containing Building object. The "HeatTransferRate" field indicates the rate at which energy is transferred from one medium to another (i.e., the Rated Output).

An ElectricalPanel object (defined in ElectricalPanel table 1902) is a BIS Component that stores configuration information relating to an electrical panel in the BMS network. The "ComponentKey" field contains a primary or foreign key for a given ElectricalPanel object. The "ContainerKey" field contains a foreign key to a containing Building object. The "ServiceType" field contains an enumerated type of panel (e.g., 1 Phase 120/240 Vac, 3 Phase 120/208 Vac, or 3 Phase 408/277 Vac).

An HVACZone object (defined in HVACZone table 1906) is a BIS Component that stores configuration information relating to a thermal zone with a dedicated thermostat. The "ComponentKey" field contains a primary or foreign key for a given HVACZone object. The "ContainerKey" field contains a foreign key to a containing Building object. The "TypicalHeatingSeasonSetpoint" field indicates a floating point setpoint applicable during a designated heating season. The "TypicalCoolingSeasonSetpoint" field indicates a floating point setpoint applicable during a designated cooling season. The "TerminalSystem" field stores information on the terminal system type, such as VAV with REHEAT, etc. The "StandAloneCoolingType" field indicates a type of stand alone cooling system, such as WALL UNIT. The "StandAloneHeatingType" field indicates a type of stand alone heating system, such as BASEBOARD. The "StandAloneCoolingCapacity" field indicates the capacity of stand alone cooling system. The "StandAloneHeatingCapacity" field indicates the capacity of stand alone heating system. The "Area" field indicates the total floor area of the corresponding zone. The "MaximumOccupancy" field indicates the maximum number of people designated to occupy the zone. The "Floor" field indicates the floor of the building on which the HVAC zone is located.

A StearnToHotWaterConverter object (defined in SteamToHotWaterConverter table 1908) is a BIS Component that stores configuration information for equipment used to convert steam energy of one loop into hot water in another loop. The "ComponentKey" field contains a primary or foreign key for a given converter object. The "ContainerKey" field contains a foreign key to a containing Building object. The "HeatTransferCapacity" field indicates a rate at which energy is transferred from one medium to another.

An AirHandler object 1910 is a BIS Component that stores configuration information relating to equipment that modifies the psychometric properties of the controlled air stream. The "ComponentKey" field contains a primary or foreign key for a given AirHandler object. The "ContainerKey" field contains a foreign key to a containing Building object. The "Humidifier" field is a bit flag indicating whether a humidifier is provided with the air handler. The "EvaporativeCooling" field is a bit flag indicating whether evaporative cooling is used. The "EvaporativeCoolingType" field indicates a type of evaporative cooling used, such as DIRECT or INDIRECT. The "NumberOfDecks" field indicates the number of decks used, such as SINGLE or DUEL. The "HeatingSource" field indicates the type of heating source used, such as GAS, ELECTRIC, LOOP or NONE. The "CoolingSource" field indicates the type of cooling source used, such as DX, LOOP, or NONE. In an embodiment of the present invention, "DX" refers to a "direct expansion" cooling source. The "PreheatingSource" field indicates the type of preheating source used, such as GAS, ELECTRIC, LOOP, or NONE. The "VolumetricFlowMode" field indicates the type of flow in the unit, such as CAV and VAV. The "VolumetricFlowModulation" field indicates the type of flow control used for VAV, such as INLET VANES, VFD, or DAMPERS.

Figure 20:
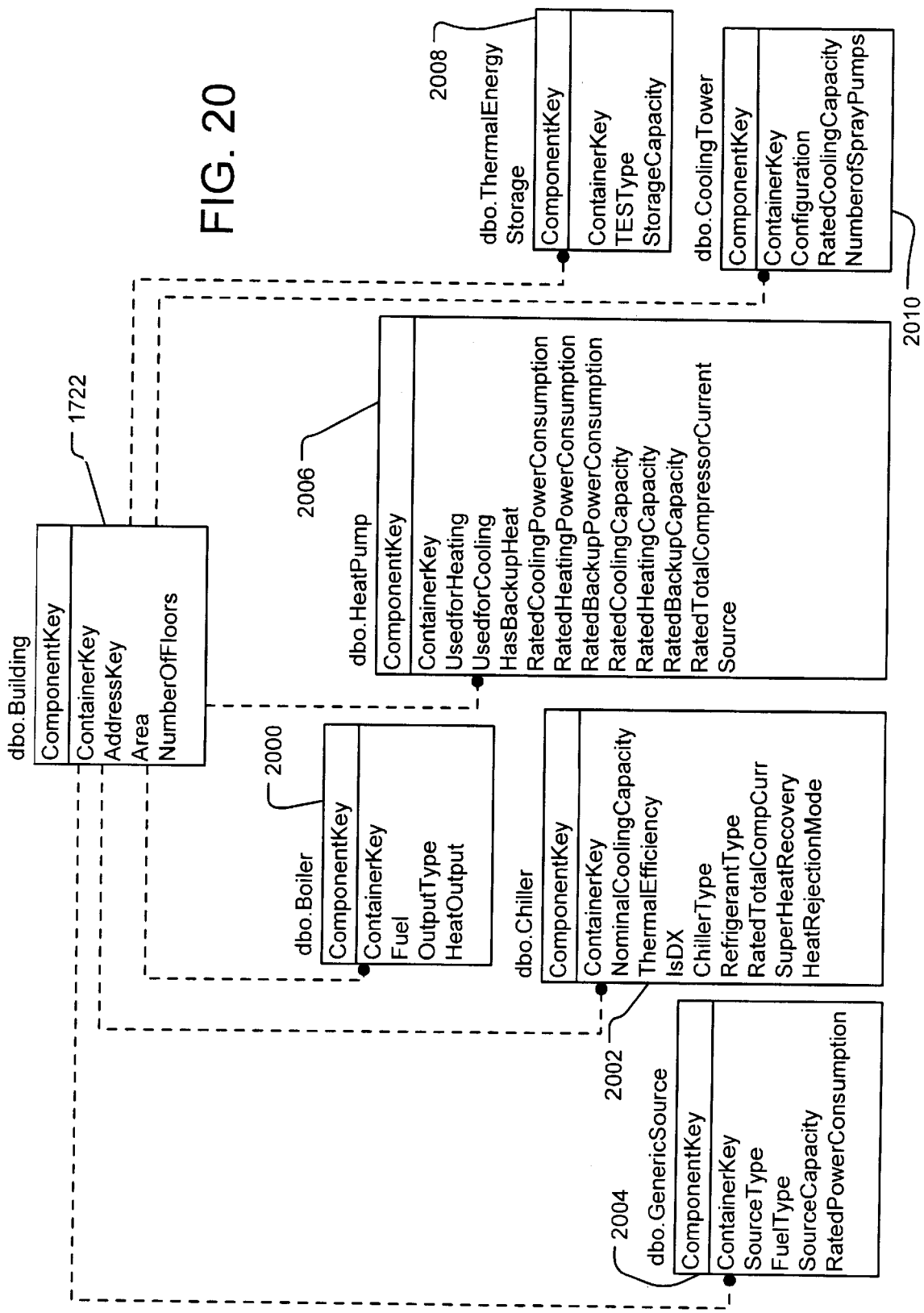
FIG. 20 illustrates additional exemplary database tables associated with a Building table in an embodiment of the present invention.

FIG. 20 illustrates additional exemplary database tables associated with a Building table in an embodiment of the present invention. A Boiler object (defined in Boiler table 2000) is a BIS Component that stores configuration information relating to equipment that converts stored energy into heat added to a fluid. The "ComponentKey" field contains a primary or foreign key for a given Boiler object. The "ContainerKey" field contains a foreign key to a containing Building object. The "Fuel" field contains an enumerated value indicating a fuel source of the boiler. The "OutputType" field indicates a type of output from a boiler, such as WATER or STEAM. The "HeatOutput" field indicates the total boiler heat output capability.

A Chiller object (defined in Chiller table 2002) is a BIS Component that stores configuration information relating to equipment used to implement a refrigeration cycle for cooling a fluid. The "ComponentKey" field contains a primary or foreign key for a given Chiller object. The "ContainerKey" field contains a foreign key to a containing Building, AirHandler, or ThermalEnergyStorage object. The "NominalCoolingCapacity" field indicates the nominal cooling capacity of the chiller at standardized conditions. The "ThermalEfficiency" field indicates the energy efficiency of the chiller at standardized conditions. The "IsDX"

field indicates whether the chiller is representing a DX device. The "ChillerType" field indicates a type of chiller, such as ELECTRIC, ABSORPTION, or ENGINE DRIVEN. The "RefrigerantType" field indicates the type of refrigerant used, such as R-11 (trifloromonoflouromethane), R-12 (difloromonoflouromethane), R-13 (chlorotriflouromethane), etc. The "RatedTotalCompressorCurrent" field indicates the total current supply to all compressors. The "SuperHeatRecovery" field indicates whether the chiller has heat recovery capability. The "HeatRejectiomMode" field indicates the type of condenser used, such as AIR COOLED, COOLING TOWER, or EVAPORATIVE.

A GenericSource object (defined in GenericSource table 2004) is a BIS Component that stores configuration information for a generic heating or cooling source. The "ComponentKey" field contains a primary or foreign key for a given GenericSource object. The "ContainerKey" field contains a foreign key to a containing Building object. The "SourceType" field indicates whether the source is HEATING or COOLING. The "FuelType" field indicates the type of fuel consumed by the source, such as ELECTRIC, GAS, OIL, KEROSENE, COAL, SOLAR, OTHER, or NONE. The "SourceCapacity" field indicates the capacity of the generic source. The "RatedPowerConsumption" field indicates the rated power input of the generic source.

A HeatPump object (defined in HeatPump object 2006) is a BIS Component that stores information relating to equipment that can alternately heat or cool and air stream using a paper compression cycle. The "ComponentKey" field contains a primary or foreign key for a given HeatPump object. The "ContainerKey" field contains a foreign key for a containing Building object. The "UsedforHeating" field indicates whether the unit is used for heating. The "UsedforCooling" field indicates whether the unit is used for cooling. The "HasBackupHeat" field indicates whether unit has backup heating capability. The "RatedCoolingPowerConsumption" field indicates the rated power input for the unit when cooling. The "RatedHeatingPowerConsumption" field indicates the rated power input for the unit when heating. The "RatedBackupPowerConsumption" field indicates the rated power input to the unit when heating in backup mode. The "RatedCoolingCapacity" field indicates the total cooling capacity of the unit. The "RatedCoolingCapacity" field indicates the total heating capacity of the unit. The "RatedBackupCapacity" field indicates the heating capacity of the unit in backup mode. The "RatedTotalCompressorCurrent" field indicates the total amperage supplied to the compressors. The "Source" field indicates the source for the heat source/sink, such as WATER or AIR.

A ThermalEnergyStorage object (defined in ThermalEnergyStorage table 2008) is a BIS Component that stores configuration information for equipment used store cooling capacity in ice or chilled water for later use. The "ComponentKey" field contains a primary or foreign key for a given ThermalEnergyStorage object. The "ContainerKey" field contains a foreign key for a containing Building object. The "TESType" field indicates the type of thermal energy storage ("TES") system used, such as CHW ("Chilled Water"), EXTERNAL MELT, INTERNAL MELT, and HARVESTER. The "StorageCapacity" field indicates the cooling energy storage capacity of the thermal energy storage device.

The CoolingTower object (defined in CoolingTower table 2010) is a BIS Component that stores configuration information relating to equipment that rejects heat into ambient air. The "ComponentKey" field contains a primary or foreign key for a given CoolingTower object. The "Container- Key" field contains a foreign key to a containing Building object. The "Configuration" field indicates the type (e.g., CLOSED or OPEN) of cooling tower, which is also called "Loop Type". The "RatedCoolingCapacity" field indicates the designed heat rejection capacity of the cooling power. The "NumberofsprayPumps" field indicates the number of spray pumps associated with a closed loop cooling tower.

Figure 21:
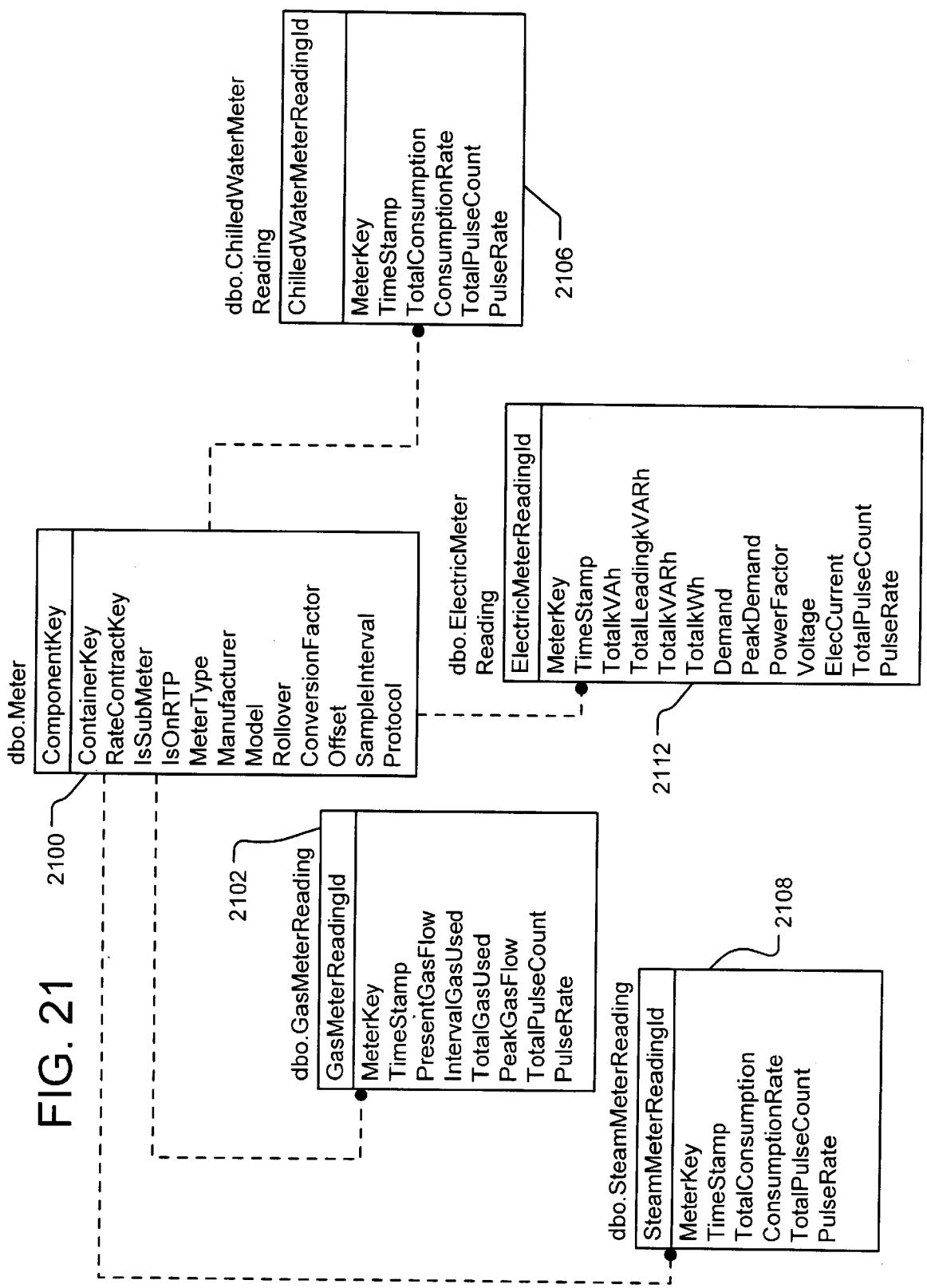
FIG. 21 illustrates exemplary database tables associated with a given BISMeter table in an embodiment of present invention.

FIG. 21 illustrates exemplary database tables associated with a given BISMeter table in an embodiment of present invention. The BISMeter table 1802 is described with regard to FIG. 18. A GasMeterReading object (defined is GasMeterReading table 2102) defines configuration information relating to a gas meter reading, including both consumption and demand data, associated with a given meter. A reading object generally stores a time-stamped, multi-valued record associated with a meter. The "GasMeterReadingId" field contains a primary key for a given GasMeterReading object 2102. The "MeterKey" field contains a foreign key to an associated BISMeter object. The "TimeStamp" field indicates the date and time of the meter reading. The "PresentGasFlow" field indicates a present value for the gas flow. The "IntervalGasUsed" field indicates the gas consumption since the last meter reading. The "TotalGasUsed" field indicates the total amount of gas used through the current gas meter. The "PeakGasFlow" field indicates the maximum calculate demand monitored by the gas meter. The "TotalPulseCount" field indicates the total pulse count for the meter. The "PulseRate" indicates the measure in pulses of gas demand monitored by the meter (e.g., the rate at which pulses are read from the meter).

A SteamMeterReading object (defined in SteamMeterReading table 2108) stores configuration information relating to a steam meter reading, including both consumption and demand data. The "SteamMeterReadingId" field contains a primary key for a given SteamMeterReading object. The "MeterKey" field contains a foreign key to an associated BISMeter object. The "TimeStamp" field indicates the date and time of the meter reading. The "TotalConsumption" field indicates the total steam monitored by the meter. The "ConsumptionRate" field indicates the present value for the steam flow. The "TotalPulseCount" field indicates the total pulse count for the meter. The "PulseRate" indicates the measure of steam demand in pulses.

An ElectricalMeterReading object (defined in ElectricalMeterReading table 2112) stores configuration information relating to an electrical meter reading, including both consumption and demand data. The "ElectricalMeterReadingId" field contains a primary key for a given ElectricalMeterReading object. The "MeterKey" field contains a foreign key to an associated BISMeter object. The "TimeStamp" field indicates the date and time of the meter reading. The "TotalkVAh" field indicates the total electricity usage monitored by the meter in kilovolts-ampere hours. The "TotalLeadingkVARh" field indicates the phase-dependent reactive power usage in kilovoltampere reactive hours ("kVARh") monitored by the meter. Reactive power expresses the flow of energy alternately toward the load and away from a load. The maximum value of this pulsating power is called the reactive voltamperes. The "TotalkVARh" field indicates the total real power kVARh monitored by the meter. The "TotalkWh" field indicates the total power monitored by the meter. The "Demand" field indicates the peak demand calculated for a given time interval. The "PeakDemand" field indicates the peak demand monitored by the meter. The "Power Factor field indicates the cosine of the phase angle between the voltage and the current. The "Voltage" field indicates the voltage on the meter. The "ElectricCurrent" indicates the amperage through the meter. The "TotalPulseCount" field indicates the total pulse count for the meter. The "PulseRate" indicates the measure of electricity demand in pulses (e.g., the rate at which pulses are read from the meter).

A ChilledWaterMeterReading object (defined in ChilledWaterMeterReading table 2106) stores configuration information relating to a chilled water meter reading, including both consumption and demand data. The "ChilledWaterMeterReadingId" field contains a primary key for a given ChilledWaterMeterReading object. The "MeterKey" field contains a foreign key to an associated BISMeter object. The "TimeStamp" field indicates the date and time of the meter reading. The "TotalConsumption" field indicates the total chilled water monitored by the meter. The "ConsumptionRate" field indicates the present value for the chilled water flow. The "TotalPulseCount" field indicates the total pulse count for the meter. The "PulseRate" indicates the measure of chilled water demand in pulses.

Figure 22:
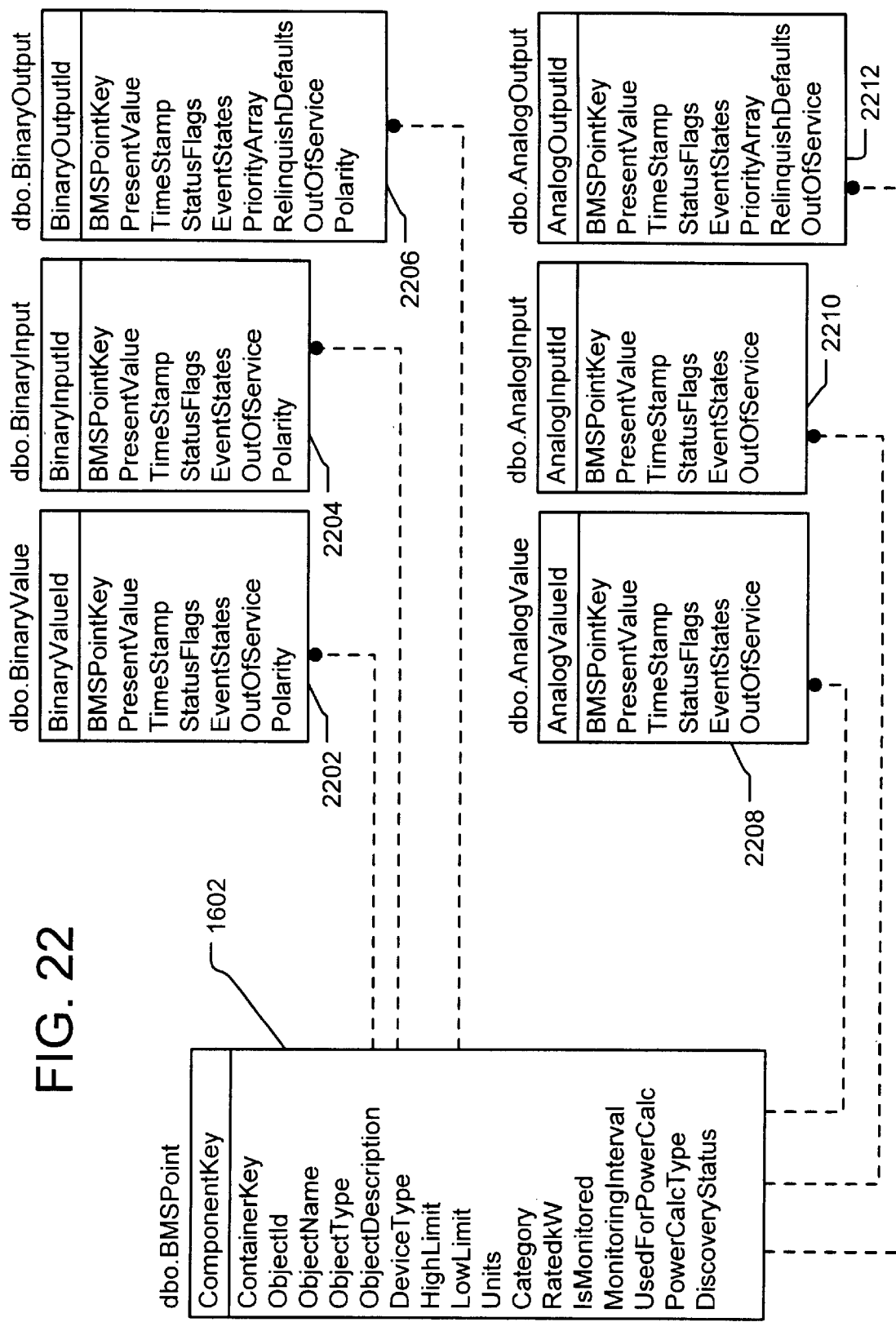
FIG. 22 illustrates database tables defining individual analog and binary data values of dynamic BMS data in an embodiment of the present invention.

FIG. 22 illustrates database tables defining individual binary and analog data values of dynamic BMS data in an embodiment of the present invention. A BinaryValue table 2202, a BinaryInput table 2204, and a BinaryOutput table 2206 store BMS data objects (e.g., time-value pairs) for dynamic binary data associated with a given BMSPoint. In an embodiment of the present invention, a Binary Value represents a binary value in a software register inside a controller. In contrast, a BinaryInput and a BinaryOutput represent a physical sensor or actuator (typically a relay) that a controller reads or controls. An input table includes BMS data monitored by points and meters in a building management system. An output table includes BMS data to be transmitted to controllers in a building management system. Each table includes a primary key field (i.e., "BinaryValueId", "BinaryInputId", and "BinaryOutputId") containing a primary key for a given time-value pair. The "BMSPointKey" field contains a numeric ID code that is unique within the BMS device that maintains the associated BMS point. In the BinaryValue table 2202 and the BinaryInput table 2204, the "PresentValue" field contains a current value, in engineering units, of a measured analog input value. In the BinaryOutput table 2206, the "PresentValue" field contains a commandable current value, in engineering units, of the analog output value. The "TimeStamp" field indicates the time and date to which the current value corresponds. The "StatusFlags" field contains four Boolean flags that indicate the general condition or status of a binary input or output, including without limitation IN ALARM, FAULT, OVERRIDDEN, and OUT OF SERVICE. The "EventStates" field represents an intrinsic alarm having states such as Normal, Fault, OffNormal, High-Limit or Low-Limit. The "Polarity" field indicates a relationship between the physical state of the output and the logical state of the present value. The "OutOfService" field is a Boolean value that equals true if the present value is decoupled from the physical input or output (e.g., so that value changes are no longer monitored by an input). The BinaryOutput table preferably includes two additional fields: (1) a "PriorityArray" field indicates a current priority of the command that has set the present value; and (2) a "RelinquishDefaults" field indicates a default value of the PresentValue" field when all priorities have a NULL value. Outside air temperature is an example of an analog input value. A pump speed setpoint on a variable speed pump is an example of an analog output value.

An AnalogValue table 2208, an AnalogInput table 2210, and an AnalogOutput table 2212 store BMS data objects (e.g., time-value pairs) for dynamic analog data associated with a given BMSPoint. In the illustrated embodiment, the component fields of the Analog tables are now it is to those of the Binary tables, except that the "Polarity" fields omitted.

Figure 23:
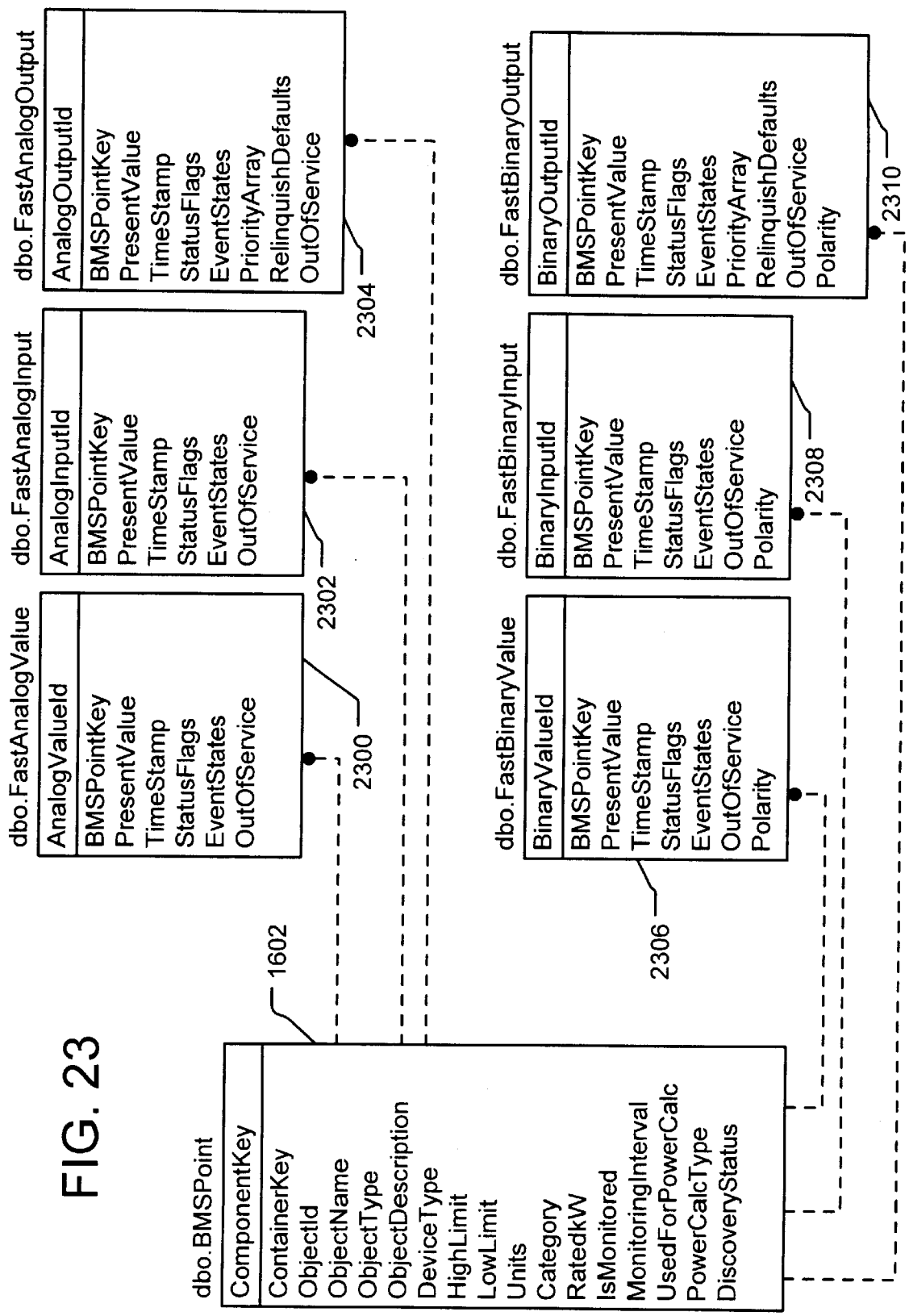
FIG. 23 illustrates database tables defining individual fast analog and fast binary data values of dynamic BMS data in an embodiment of the present invention.

FIG. 23 illustrates database tables defining individual fast analog and fast binary data values of dynamic BMS data in an embodiment of the present invention. The table structures for data tables 2300, 2302, 2304, 2306, 2308, and 2310 are analogous to their non-fast counterparts discussed with regard to FIG. 22. For example, in an embodiment of the present invention, a BIS user can change the polling frequencies of BMS points. If some points are polled very frequently, the data can overwhelm the database. In a building information system having a requirement of storing hourly data for two years, adequate disk space requirements may be considered excessive. To accommodate fast polling frequencies and long data retention in an embodiment of the present invention, the real-time data storage is characterized in one of two different categories: (1) Data polled faster than fifteen minute intervals (Fast); and (2) data polled slower than fifteen minute intervals (non-Fast). In one embodiment, one point value an hour is written to the non-Fast tables, even if the point is polled at a high frequency. In this manner, an administrator who archives data to free up disk space can remove high frequency data from the Fast tables without deleting or archiving the long term, low frequency data in the non-Fast tables.

Figure 24:
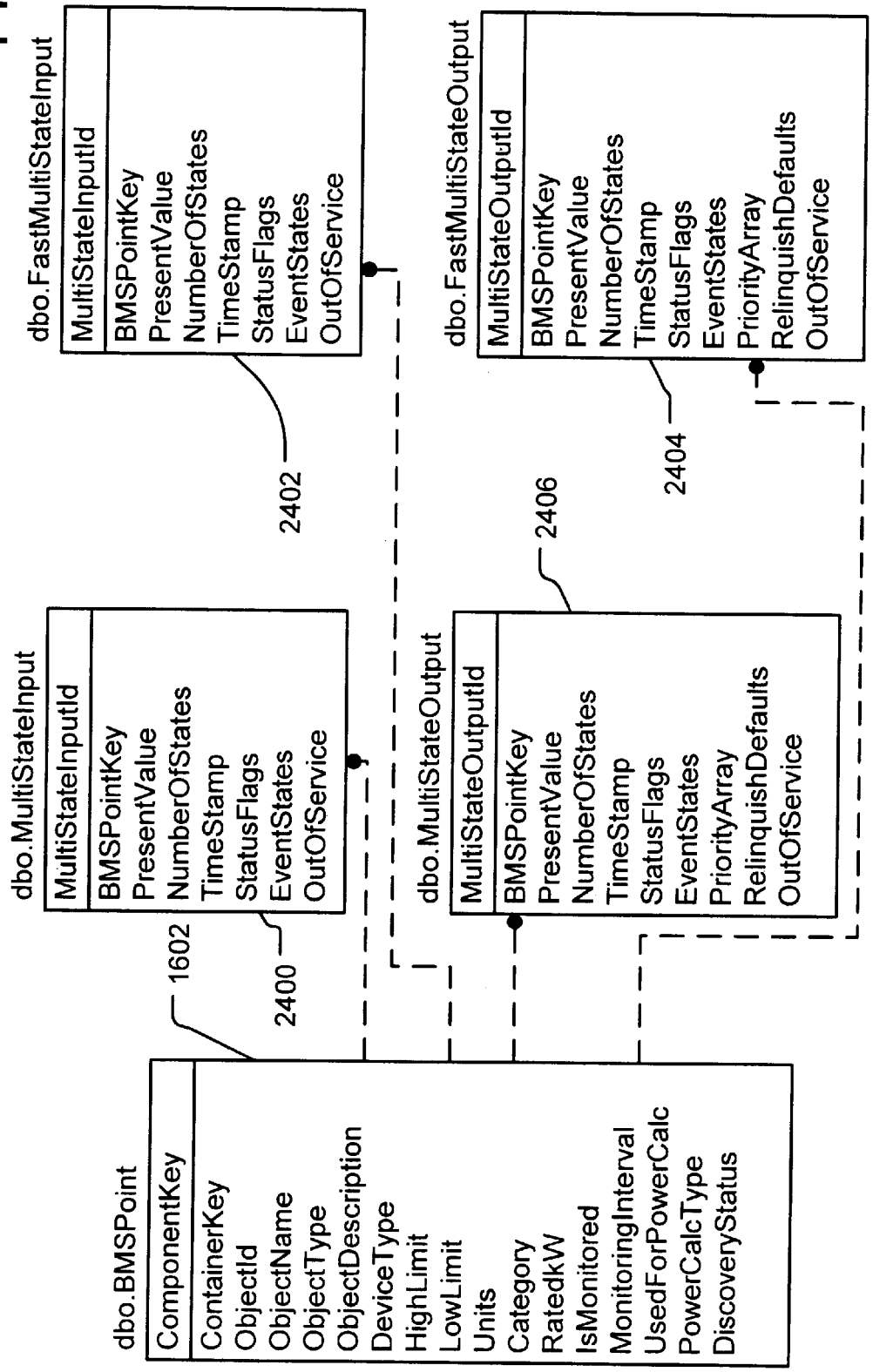
FIG. 24 illustrates database tables defining individual multistate data values of dynamic BMS data in an embodiment of the present invention.

FIG. 24 illustrates database tables defining individual multistate data values of dynamic BMS data in an embodiment of the present invention. The table structures for data tables 2400, 2402, 2404, and 2406 are analogous to their analog counterparts discussed with regard to FIGS. 22 and 23. In an embodiment of the present invention, the term "multistate" describes a device having more discrete states than a binary device. For example, a multistate fan may have a fan speed having four possible states: off, low, medium, and high.

Figure 25:
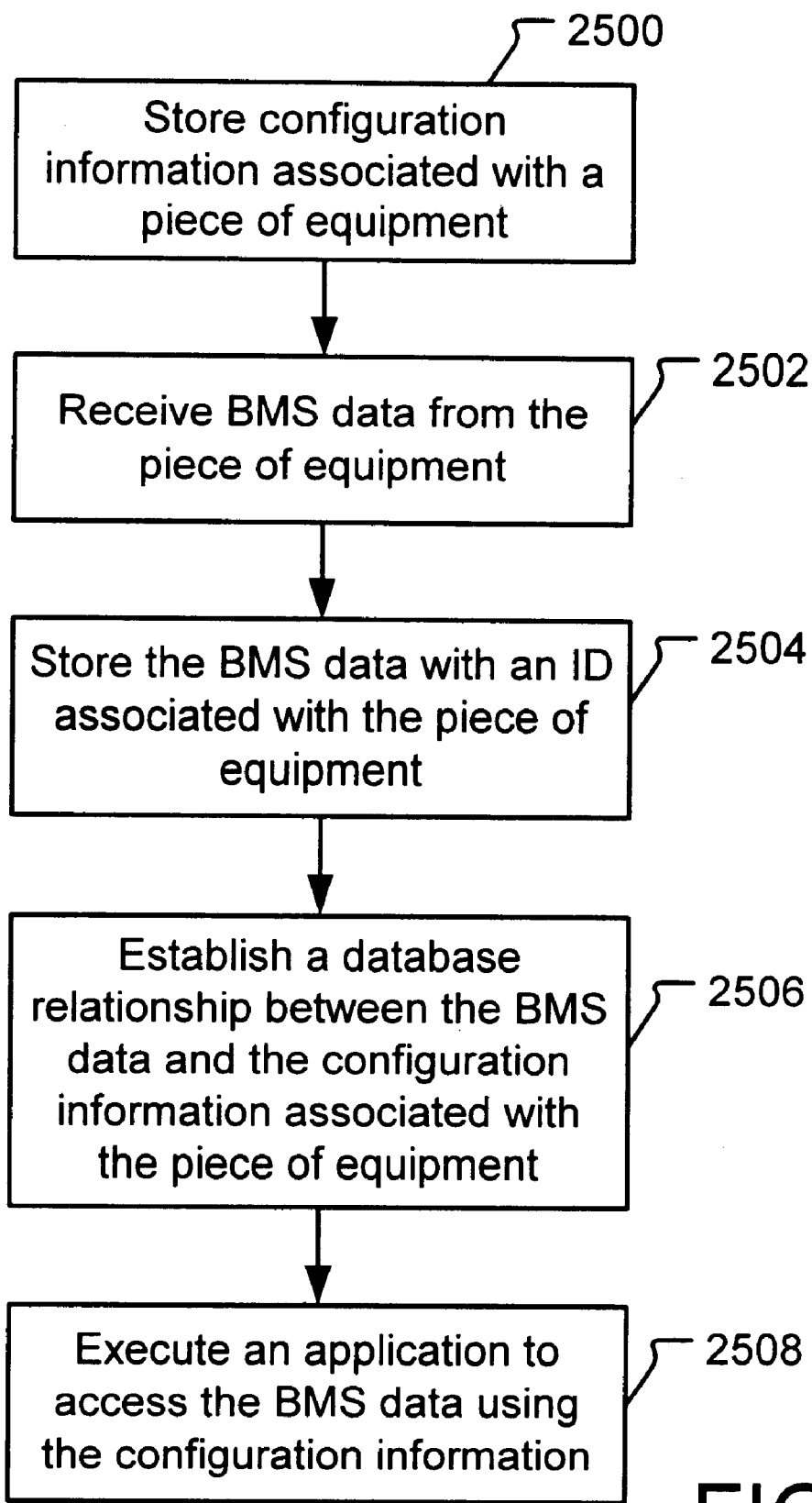
FIG. 25 illustrates a flow of operations for managing a building information system in an embodiment of the present invention.

FIG. 25 illustrates a flow of operations for managing a building information system in an embodiment of the present invention.. A configuring operation 2500 stores configuration information associated with a piece of equipment in the BIS database. Examples of configuration information include without limitation information about the owner and address of a given building, the utilities supplying the building, real-world descriptions of the equipment and hotspot descriptions of sensors, actuators, and meters on the equipment, and other BIS-related configuration information. A receiving operation 2502 receives dynamic BMS data from the piece of equipment on the BMS network. A storing operation 2504 stores the dynamic BMS data with an ID associated with a piece of equipment. In an embodiment of the present invention, the dynamic BMS data is stored in database tables described with regard to FIG. 22–24, with each dynamic BMS data value being associated with the ObjectId in the BMSPoint object. A mapping operation 2506 establishes a database relationship between the BMS data and the configuration information associated with a piece of equipment. Examples of this operation include recording an entry in the BISMeterPoint table 1502 or the BISPoint table 1508 of FIG. 15, such that the entry establishes a correspondence between a BIS component and a BMS object. In an alternative embodiment, the mapping operation 2506 may occur before the dynamic BMS data is actually stored in the database tables associated with the BMSPoint object. In this manner, the database relationship is established through the BMSPoint object, and database tables of dynamic BMS data are thereafter added in association with the BMSPoint object as the data is received.

An application operation 2508 executes an application to access BMS data using the configuration information. For example, a generic monitoring application may be written to monitor the dynamic BMS data without specific information about the BMS itself. That is, the monitoring application can reference buildings and equipment using textual descriptions or identifiers, and specific sensors, actuators, and meters using hotspot descriptions that are specific in their meaning (e.g., "Chilled Water Inlet Temperature"), rather than the cryptic 8-character BMS identifiers.

The scope of the present invention is not limited to the exemplary embodiments described herein, including heating ventilation, air conditioning, and lighting. Without departing from the present invention, additional embodiments may be directed to other building subsystems and databases, including without limitation photocopier subsystems, printer subsystems, vendor and contact databases, laundry subsystems, and cafeteria-oriented subsystems and services.

While the methods disclosed herein have been described and shown with reference to particular operations performed in a particular order, it will be understood that these operations may be combined, sub-divided, or re-ordered to form an equivalent method without departing from the teachings of the present invention. Accordingly, unless specifically indicated herein, the order and groupings of the operations are not limitations of the present invention.

The above specification, examples and data provide a complete description of the systems, methods and computer program products of the invention. Since many embodiments of the invention can be made without departing from the spirit and scope of the invention, the invention resides in the claims hereinafter appended.

We claim:

1. A computer-readable storage medium storing a data structure for use in a building information system including a building management system program module and a building management system network coupled to one or more buildings, the data structure comprising:

building management system data associated with a piece of equipment coupled to the building management system network;

one or more building management system database objects storing dynamic building management system data associated with the piece of equipment coupled to at least one of the buildings on the building management system network, wherein the one or more building management system database objects comprise:

a building management system point object representing a building management system point on the piece of equipment in the building management system; and one or more building management data objects corresponding to a time-value pair received from the building management system point;

a building information system configuration object storing configuration information associated with the piece of equipment; and a mapping structure establishing a database relationship between the dynamic building management system data of the building management system database object and the configuration information of the building information system configuration object.

2. A computer-readable storage medium storing a data structure for use in a building information system including a building management system program module and a building management system network coupled to one or more buildings, the data structure comprising:

building management system data associated with a piece of equipment coupled to the building management system network;

one or more building management system database objects storing dynamic building management system data associated with the piece of equipment coupled to at least one of the buildings on the building management system network; wherein the dynamic building management system data includes an electrical current consumption value relating to the piece of equipment, the configuration information includes supply voltage level value, and the mapping structure associates the electrical current consumption value and the supply voltage level value to allow calculation of power consumption by the piece of equipment;

a building information system configuration object storing configuration information associated with the piece of equipment; and a mapping structure establishing a database relationship between the dynamic building management system data of the building management system database object and the configuration information of the building information system configuration object.

3. A computer-readable storage medium storing a data structure for use in a building information system including a building management system program module and a building management system network coupled to one or more buildings, the data structure comprising:

building management system data associated with a piece of equipment coupled to the building management system network;

one or more building management system database objects storing dynamic building management system data associated with the piece of equipment coupled to at least one of the buildings on the building management system network;

a building information system configuration object storing configuration information associated with the piece of equipment;

a mapping structure establishing a database relationship between the dynamic building management system data of the building management system database object and the configuration information of the building information system configuration object;

wherein the dynamic building management system data includes a discovery status and a point identifier associated with building management system point, the configuration information includes a location of the building management system point, and the building information system program module includes a point discovery processor identifying that the building management system point had previously responded to a first discovery request and fails to respond to a subsequent discovery request; and an alarm communicated to personnel identified in the configuration information to characterize the building management system point as a lost point.

4. The computer-readable storage medium of claim 3 wherein the alarm further characterizes the location and description of the lost point, based on the configuration information mapped to the building management system point.

5. A computer system for managing a building information system including a building management system and a building management system network coupled to one or more buildings, the computer system comprising:
- one or more building management system database objects storing dynamic building management system data associated with a piece of equipment on the building management system network;
- a configuration database object storing configuration information associated with the piece of equipment;
- a mapping structure establishing a database relationship between the dynamic building management system data of the building management system database objects and the configuration information of the configuration database object; and
- a processor executing a program module accessing the building management system database object in combination with the configuration database object, based on the database relationship;
- wherein the dynamic building management system data includes a discovery status and a point identifier associated with a point, the configuration information includes a location of the building management system point, and further comprising:
  - a point discovery processor identifying that the point had previously responded to a first discovery request and fails to respond to a subsequent discovery request; and
  - an alarm communicated to personnel identified in the configuration information to characterize the point as a lost point.

6. The computer system of claim 5 wherein the alarm further characterizes the location and description of the lost point, based on the configuration information mapped to the point.

7. A method of managing a building information system including a building management system and a building management system network coupled to one or more buildings, the method comprising:
- providing building management system data associated with a piece of equipment on the building management system network;
- providing configuration information associated with the piece of equipment;
- establishing a database relationship between the dynamic building management system data and the configuration information; and
- executing a program module accessing the dynamic building management system data in combination with the configuration information, based on the database relationship.

8. The method of claim 7 wherein the program module include a service that calculates the power consumption of the piece of equipment based on a first operational parameter stored in the dynamic building management system data and second operational parameter stored in the configuration information.

9. A method of managing a building information system including a building management system and a building management system network coupled to one or more buildings, the method comprising:
- providing building management system data associated with a piece of equipment on the building management system network;
- providing configuration information associated with the piece of equipment; and
- establishing a database relationship between the dynamic building management system data and the configuration information, wherein the operation of establishing a database relationship comprises:
  - receiving a first selection of a point from a list of discovered points on the building management system network;
  - receiving a second selection of a hotspot from a schematic of the piece of equipment;
  - configuring a mapping structure referencing both the point and the hotspot, based on the receiving operations.

10. A computer data signal embodied in a carrier wave by a computing system and encoding a computer program for executing a method of managing a building information system including a building management system and a building management system network coupled to one or more buildings, the method comprising:
- providing building management system data associated with a piece of equipment on the building management system network;
- providing configuration information associated with the piece of equipment; and
- establishing a database relationship between the dynamic building management system data and the configuration information.

11. A computer-readable medium having computer-executable instructions for performing a method of managing a building information system including a building management system and a building management system network coupled to one or more buildings, the method comprising:
- providing building management system data associated with a piece of equipment on the building management system network;
- providing configuration information associated with the piece of equipment; and
- establishing a database relationship between the dynamic building management system data and the configuration information.

12. A computer-readable medium as defined in claim 11, wherein the step of providing building management system data further includes creating one or more building management system database objects storing the dynamic building management system data.

13. A computer-readable medium as defined in claim 12, wherein the step of providing configuration information further includes creating a building information system configuration object storing the configuration information.

14. A computer-readable medium as defined in claim 13, wherein the step of establishing a database relationship between the dynamic building management system data and the configuration information further includes creating a mapping structure establishing a database relationship between the dynamic building management system data of the building management system database object and the configuration information of the building information system configuration object.

15. A computer-readable medium as defined in claim 14, wherein the mapping structure is configured in response to a user-initiated action associating a point identifier of a building management system point with a hotspot location on a schematic of the piece of equipment.

16. A computer-readable medium as defined in claim 14, further comprising automatically discovering a point identifier of a building management system point on the building information system network and storing the point identifier as a part of the dynamic building management system data.

17. A computer-readable medium as defined in claim 16, wherein the configuration information includes schematic information indicating predetermined point locations on the piece of equipment and the mapping structure is configured in response to a user-initiated action graphically associating the point identifier with one of the predetermined point locations.

18. A computer-readable medium as defined in claim 14, wherein the dynamic building management system data is received from a building management system point coupled to the piece of equipment on the building management system network, and the one or more building management system database objects comprise:
   a dynamic data value field storing the dynamic building management system data;
   a point identifier value identifying the building management system point on the piece of equipment; and
   a point identifier field storing the point identifier value in association with the dynamic building management system data stored in the dynamic data value field.

19. A computer-readable medium as defined in claim 18, wherein the mapping structure comprises:
   a first unique identifier to one of the building management system database objects; and
   a second unique identifier to the building information system configuration object.

20. A computer-readable medium as defined in claim 14, wherein the dynamic building management system data is received from a building management system meter coupled to the piece of equipment on the building management system network, and the one or more building management system database objects comprise:
   a dynamic data value field storing the dynamic building management system data;
   a meter identifier value identifying the building management system meter on the piece of equipment; and
   a meter identifier field storing the meter identifier value in association with the dynamic building management system data stored in the dynamic data value field.

21. A computer-readable medium as defined in claim 14, wherein the dynamic building management system data is stored for transmission to a building management system controller coupled to the piece of equipment on the building management system network, and the one or more building management system database objects comprise:
   a dynamic data value field storing the dynamic building management system data;
   a controller identifier value identifying the building management system controller on the piece of equipment; and
   a controller identifier field storing the controller identifier value in association with the dynamic building management system data stored in the dynamic data value field.

22. A computer-readable medium as defined in claim 14, wherein the one or more building management system database objects further comprise:
   a building management system attribute characterizing the building management system point as one of analog, digital, and multistate.

23. A computer-readable medium as defined in claim 14, wherein the one or more building management system database objects further comprise:
   a building management system attribute identifying the building management system point as one of an input, an output, and a value.

24. A computer-readable medium as defined in claim 14, wherein the dynamic building management system data includes energy consumption data associated with the piece of equipment and the configuration information includes utility rates associated with the piece of equipment.

25. A computer-readable medium as defined in claim 14, wherein the dynamic building management system data includes energy consumption data and associated alarm limits relating to the piece of equipment and the configuration information includes contact information used to signal an alarm.

26. A computer-readable medium as defined in claim 14, wherein the dynamic building management system data includes an electrical current consumption value relating to the piece of equipment, the configuration information includes supply voltage level value, and the mapping structure associates the electrical current consumption value and the supply voltage level value to allow calculation of power consumption by the piece of equipment.

* * * * *